United States Patent
Koller et al.

(10) Patent No.: US 6,630,002 B2
(45) Date of Patent: Oct. 7, 2003

(54) PROCESS FOR THE STAINING OF WOOD WITH AQUEOUS WOOD STAINS

(75) Inventors: Stefan Koller, Ramlinsburg (CH); Peter Scheibli, Binningen (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 69 days.

(21) Appl. No.: 09/850,493

(22) Filed: May 7, 2001

(65) Prior Publication Data

US 2002/0000011 A1 Jan. 3, 2002

(30) Foreign Application Priority Data

May 11, 2000 (EP) .............................................. 00810402

(51) Int. Cl.⁷ .............................. D06P 3/62; D06P 1/645
(52) U.S. Cl. ...................... 8/402; 8/442; 8/490; 8/568
(58) Field of Search ............................ 8/402, 568, 442, 8/490

(56) References Cited

U.S. PATENT DOCUMENTS

| 5,171,328 A | 12/1992 | Trauth et al. ................... 8/402 |
| 5,746,778 A | * 5/1998 | Jankewitz et al. |
| 5,814,107 A | * 9/1998 | Gadoury et al. |
| 6,254,724 B1 | 7/2001 | Seltzer et al. ................... 162/70 |

FOREIGN PATENT DOCUMENTS

| EP | 0943665 | 9/1999 |
| GB | 2328210 | 2/1999 |
| JP | 11-170686 | * 6/1999 |

OTHER PUBLICATIONS

Allen et al., "Factors Influencing the Photofading of Commercial Anthraquinone Dyes in Solution," Dyes and Pigments,2(1981) 219–229.*

* cited by examiner

Primary Examiner—Margaret Einsmann
(74) Attorney, Agent, or Firm—Kevin T. Mansfield

(57) ABSTRACT

The present invention relates to a process for the staining of wood, which comprises treating the unstained wood with an aqueous preparation comprising a) at least one dye, and
b) at least one dye stabilizer of the formula (I) or (II)

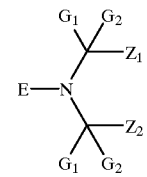

(I)

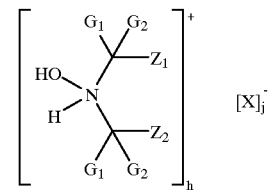

(II)

in which $G_1$ and $G_2$, independently of one another, are $C_1$–$C_4$alkyl or together are pentamethylene, $Z_1$ and $Z_2$ are methyl, or $Z_1$ and $Z_2$ form a bridging member which is unsubstituted or substituted by an ester, ether, hydroxyl, oxo, cyanohydrin, amido, amino, carboxyl or urethane radical, E is oxyl or hydroxyl, and X is an inorganic or organic anion, and the total number of cations h corresponds to the total number of anions j, to a wood stain comprising a dye and a dye stabilizer of the formula (I) or (II), and to the use of this wood stain for the staining of wood.

6 Claims, No Drawings

PROCESS FOR THE STAINING OF WOOD WITH AQUEOUS WOOD STAINS

The present invention relates to aqueous wood stains and to their use in a process for the staining of wood.

Stained woods, or the dyes applied to the wood often exhibit undesired bleaching or changes in shade as a result of the action of light and/or heat. Furthermore, the stained woods often display a colour unlevelness.

The use of solvent-containing wood stains for the photochemical and thermal stabilization of the (unstained) material wood is known, for example, from EP-A-0 943 665.

EP-A-0 479 075 discloses the treatment of wood with a wood stain comprising a colorant, a solvent and a stabilizer.

There continues to be a need for an improved protection of the stained wood against light and evolution of heat, and for a process which permits even penetration of the wood and uses low-solvent or solvent-free wood stains.

The object of the present invention was therefore to provide a process according to which the stained wood would satisfy today' requirements with regard to penetration, photostability and heat stability.

It has now been found that using the special wood stains described below it is possible to achieve good penetration and very good stabilization of stained wood.

Accordingly, the present invention provides a process for the staining of wood, which comprises treating the unstained wood with an aqueous preparation (stain) comprising a) at least one dye and
b) at least one dye stabilizer of the formulae (I) or (II)

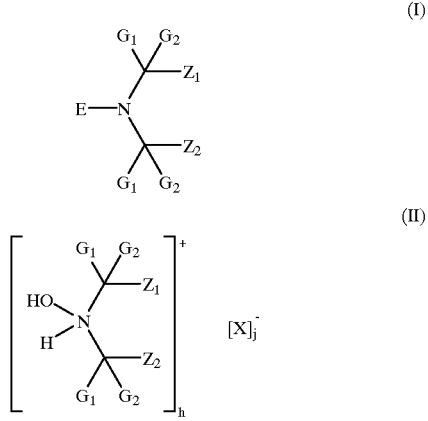

in which
$G_1$ and $G_2$, independently of one another, are $C_1$–$C_4$alkyl or together are pentamethylene,
$Z_1$ and $Z_2$ are methyl, or $Z_1$ and $Z_2$ form a bridging member which is unsubstituted or substituted by an ester, ether, hydroxyl, oxo, cyanohydrin, amido, amino, carboxyl or urethane radical,
E is oxyl or hydroxyl, and
X is an inorganic or organic anion, and
the total number of cations h corresponds to the total number of anions j.

Preference is given to dye stabilizers of the formulae (I) and (II) in which $Z_1$ and $Z_2$ are methyl or a bridging member containing 1–200 carbon atoms and 0–60 oxygen and/or nitrogen atoms.

X is, for example, phosphate, carbonate, bicarbonate, nitrate, chloride, bromide, bisulfite, sulfite, bisulfate, sulfate, borate, carboxylate, alkylsulfonate, arylsulfonate or phosphonate, for example diethylenetriaminepentamethylenephosphonate.

X as carboxylate is, in particular, a formate, acetate, benzoate, citrate, oxalate, tartrate, acrylate, polyacrylate, fumarate, maleate, itaconate, glycolate, gluconate, malate, mandalate, tiglate, ascorbate, polymethacrylate, nitrilotriacetate, hydroxyethylethylenediaminetriacetate, ethylenediaminetetraacetate or diethylenetriaminepentaacetate.

X is preferably chloride, bisulfite, bisulfate, sulfate, phosphate, nitrate, ascorbate, acetate, citrate, ethylenediaminetetraacetate or diethylenetriaminepentaacetate;

X is particularly preferably bisulfate or citrate.

h and j are preferably 1–5.

As a bridging member, $Z_1$ and $Z_2$ preferably contain 2 or 3 carbon atoms or 1 or 2 carbon atoms and a nitrogen or oxygen atom which together with the radical of the formulae (I) or (II) form a 5-membered or 6-membered heterocyclic ring which may be further substituted. The substituents of $Z_1$ and $Z_2$ can also contain radicals of sterically hindered amines. Preference is given to compounds of the formulae (I) and (II) containing 1–4, in particular 1 or 2, sterically hindered amines or sterically hindered ammonium radicals. Aryl is to be understood as meaning, for example, $C_6$–$C_{12}$aryl, in particular phenyl or naphthyl, especially phenyl.

The dye stabilizers given under b) can be used individually or as mixtures with one another.

Alkyl is to be understood as meaning, for example, $C_1$–$C_{18}$alkyl, such as methyl, ethyl, n-propyl, isopropyl, n-butyl, isobutyl, sec-butyl, tert-butyl, pentyl, hexyl, heptyl, octyl, nonyl, decyl, undecyl, dodecyl, tridecyl, tetradecyl, pentadecyl, hexadecyl, heptadecyl or octadecyl.

Alkylene is to be understood as meaning, for example, methylene, 1,2-ethylene, 1,1-ethylene, 1,3-propylene, 1,2-propylene, 1,1-propylene, 2,2-propylene, 1,4-butylene, 1,3-butylen, 1,2-butylene, 1,1-butylene, 2,2-butylene, 2,3-butylene, or —$C_5H_{10}$—, —$C_6H_{12}$—, —$C_7H_{14}$—, —$C_8H_{16}$—, —$C_9H_{18}$—, —$C_{10}H_{20}$—, —$C_{11}H_{22}$—, —$C_{12}H_{24}$—, —$C_{13}H_{26}$—, —$C_{14}H_{28}$—, —$C_{15}H_{30}$—, —$C_{16}H_{32}$—, —$C_{17}H_{34}$— and —$C_{18}H_{36}$—.

Cycloalkyl or cycloalkoxy are to be understood as meaning, for example, $C_5$–$C_{12}$-cycloalkyl or $C_5$–$C_{12}$-cycloalkoxy, such as cyclopentyl, cyclohexyl, cycloheptyl, cyclooctyl, cyclononyl, cyclodecyl, cycloundecyl or cyclododecyl, cyclopentoxy, cycloheptoxy, cyclodecyloxy or cyclododecyloxy.

Cycloalkenyl is to be understood as meaning, for example, $C_5$–$C_{12}$cycloalkenyl, such as cyclopentenyl, cyclohexenyl, cycloheptenyl, cyclooctenyl or cyclononenyl.

Aralkyl and aralkoxy are preferably phenylalkyl or phenylalkoxyl, such as benzyl, benzyloxy, α-methylbenzyl, α-methylbenzyloxy, cumyl or cumyloxy.

Alkenyl radicals are, for example, $C_2$–$C_{18}$alkenyl, in particular allyl.

Alkynyl radicals are, for example, $C_2$–$C_{12}$alkynyl, in particular propargyl.

Acyl is, for example, a radical R(C=O)—, in which R is an aliphatic or aromatic radical.

Aliphatic or aromatic radical means, for example, an aliphatic or aromatic $C_1$–$C_{30}$hydrocarbon; for example aryl, alkyl, cycloalkyl, alkenyl, cycloalkenyl, bicycloalkyl, bicycloalkenyl, and a combination of these radicals.

Examples of acyl are $C_2$–$C_{12}$alkanoyl, $C_3$–$C_{12}$alkenoyl and benzoyl.

Examples of alkanoyl are formyl, propionyl, butyryl, pentanoyl, octanoyl and, in particular, acetyl.

Alkenoyl is preferably acryloyl or methacryloyl.

The alkyl substituents may be linear or branched.

Examples of $C_1$–$C_6$alkyl are methyl, ethyl, n-propyl, isopropyl, n-butyl, isobutyl, sec-butyl, tert-butyl, pentyl and hexyl.

Examples of $C_2$–$C_4$alkenyl are ethenyl, propenyl and butenyl.

Examples of $C_1$–$C_4$alkyl which is interrupted by one or two oxygen atoms are —$CH_2$—O—$CH_3$, —$CH_2$—$CH_2$—O—$CH_3$, —$CH_2$—$CH_2$—O—$CH_2$—$CH_3$, —$CH_2$—O—$CH_2CH_2$—O—$CH_3$ and —$CH_2$—O—$CH_2$—O—$CH_3$.

Preference is given to the dye stabilizers given under b) chosen from the compounds A to EE and A* to EE* and III to IIIc

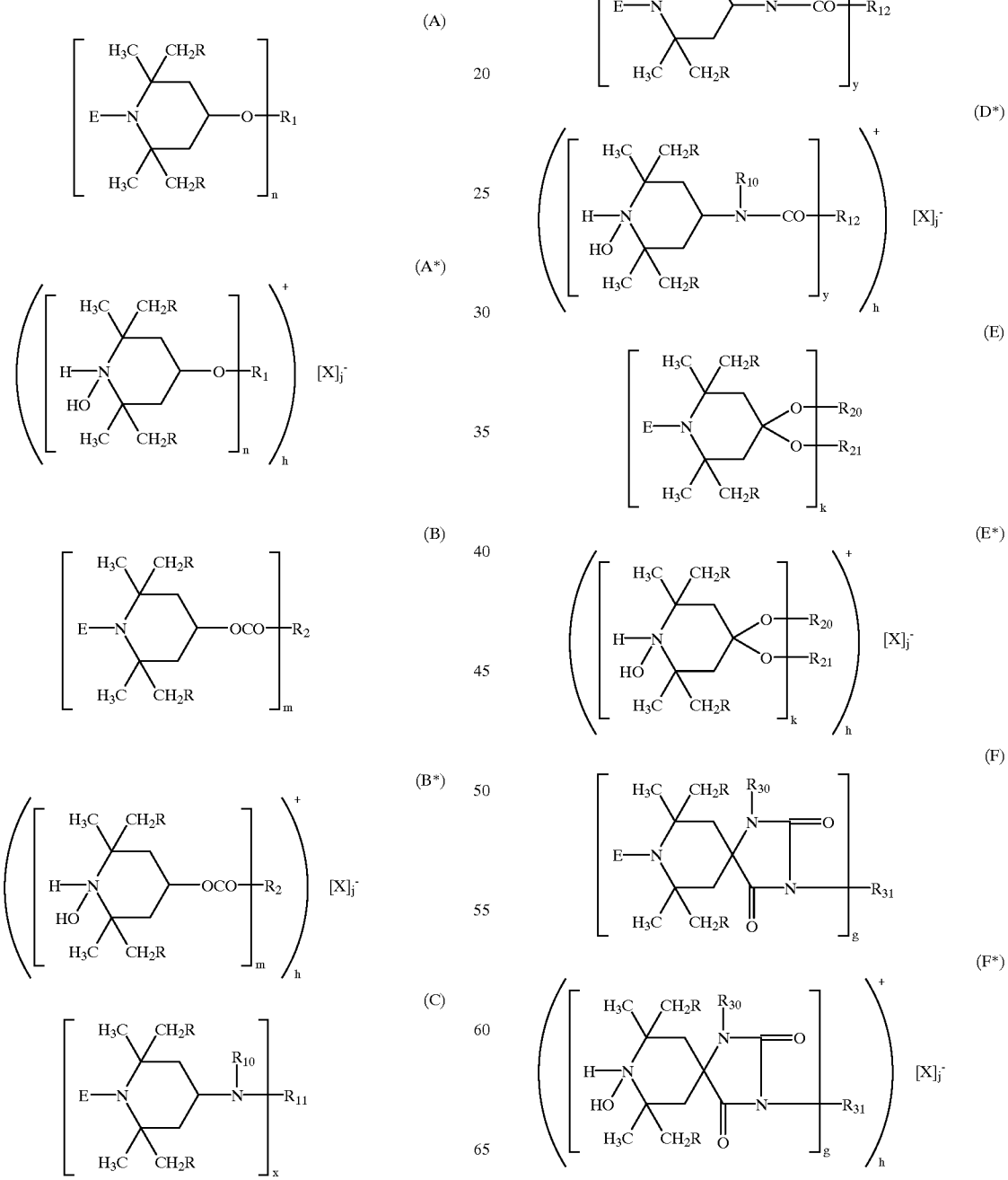

(G) 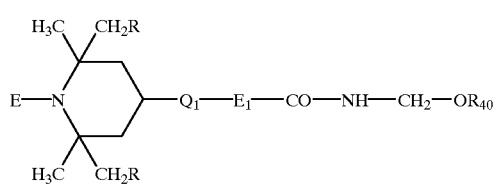
(G*) 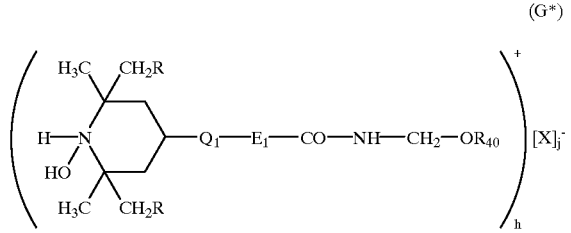
(H) 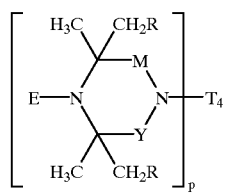
(H*) 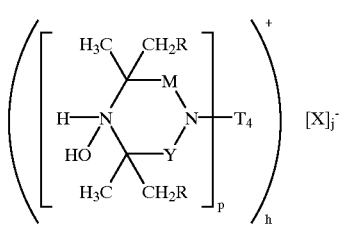
(I) 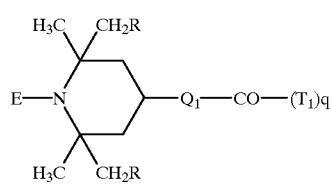
(I*) 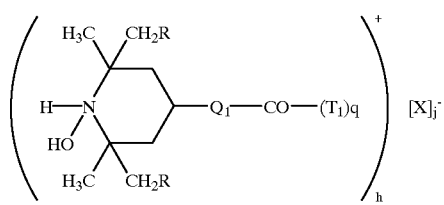
(J) 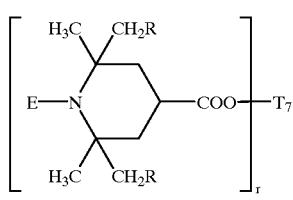
(J*) 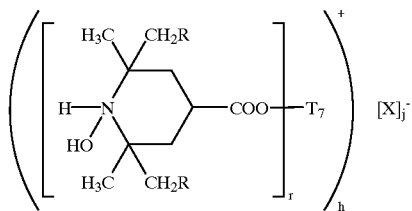
(K) 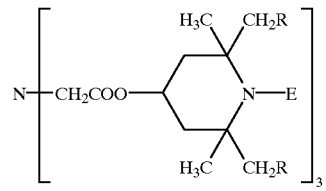
(K*) 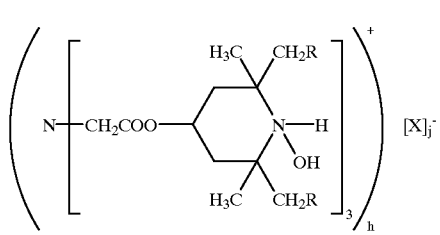
(L) 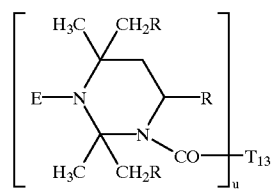
(L*) 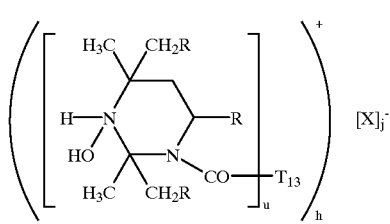
(M) 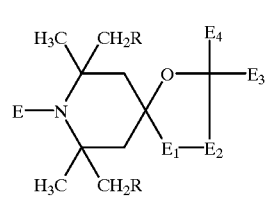
(M*) 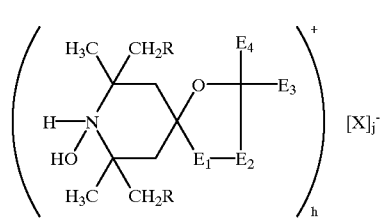

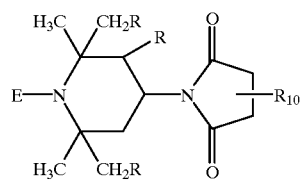 (O)
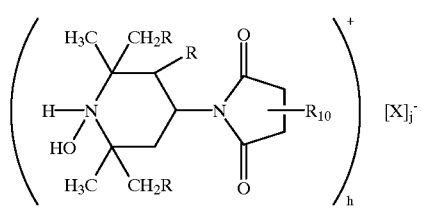 (O*)
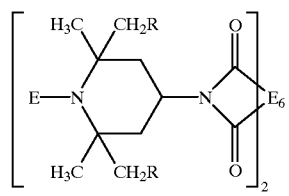 (P)
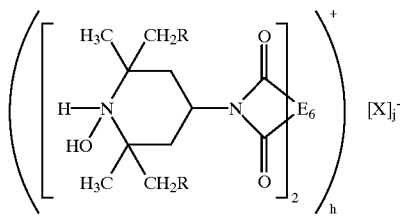 (P*)
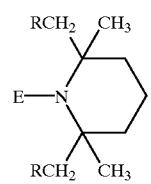 (Q)
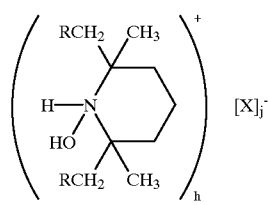 (Q*)
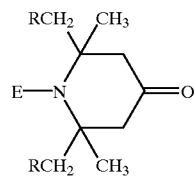 (R)
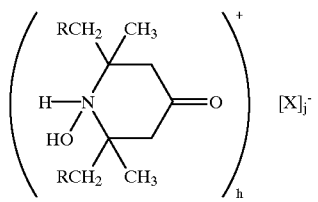 (R*)
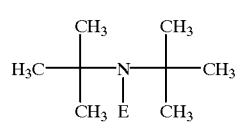 (S)
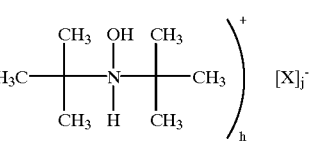 (S*)
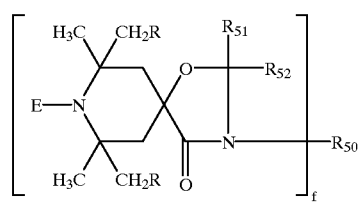 (T)
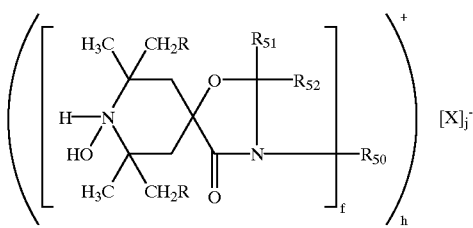 (T*)
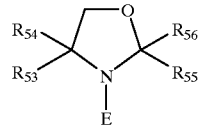 (U)
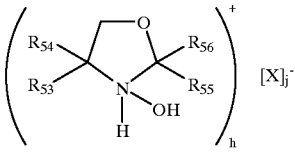 (U*)
(V)

-continued
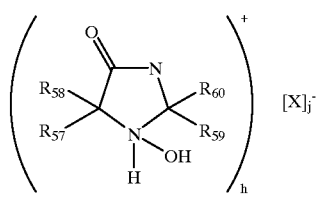 (V*)
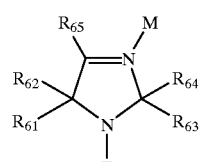 (W)
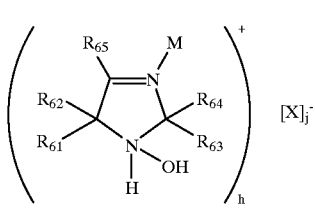 (W*)
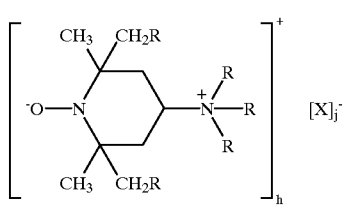 (X)
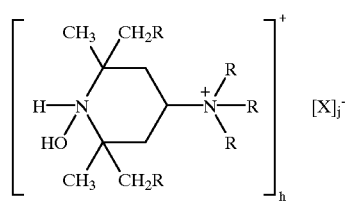 (X*)
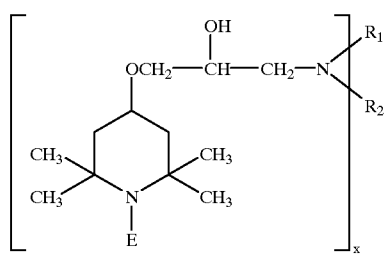 (Y)
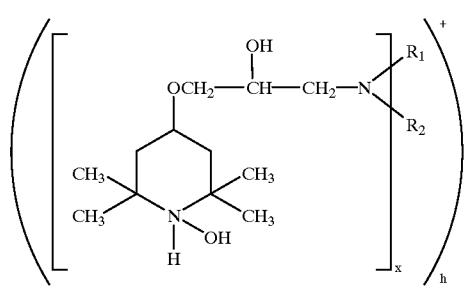 (Y*)
-continued
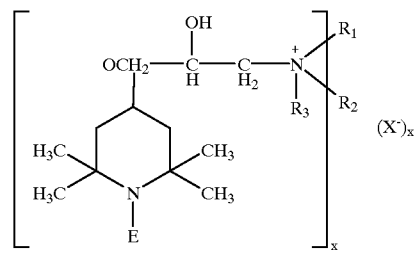 (Z)
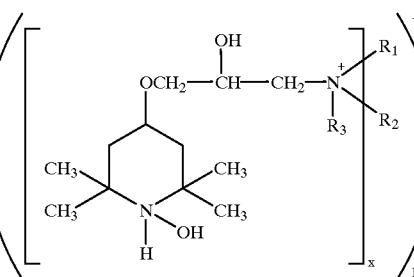 (Z*)
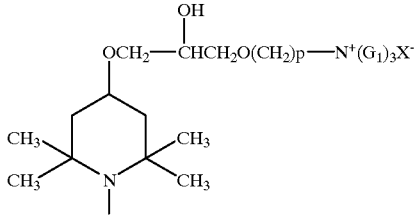 (AA)
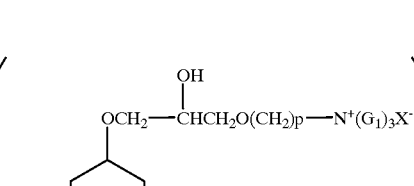 (AA*)
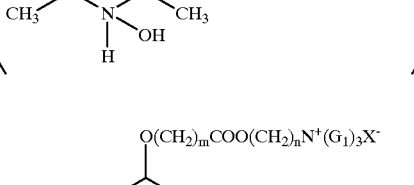 (BB)
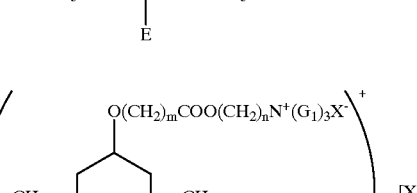 (BB*)
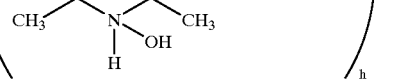

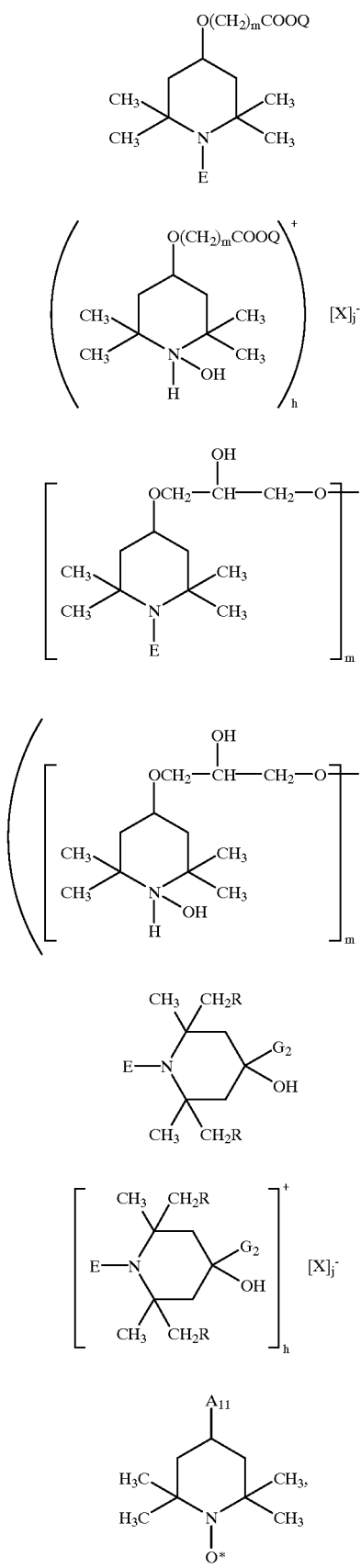

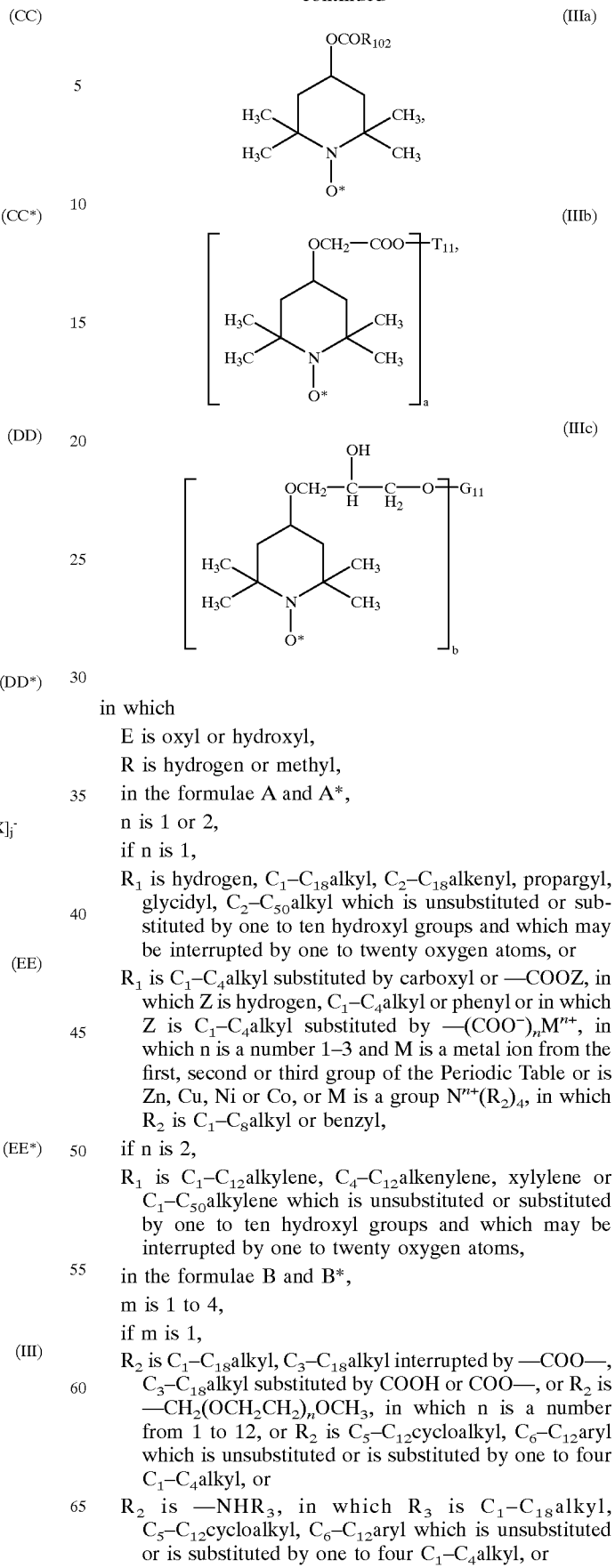

in which
  E is oxyl or hydroxyl,
  R is hydrogen or methyl,
  in the formulae A and A*,
  n is 1 or 2,
  if n is 1,
  $R_1$ is hydrogen, $C_1$–$C_{18}$alkyl, $C_2$–$C_{18}$alkenyl, propargyl, glycidyl, $C_2$–$C_{50}$alkyl which is unsubstituted or substituted by one to ten hydroxyl groups and which may be interrupted by one to twenty oxygen atoms, or
  $R_1$ is $C_1$–$C_4$alkyl substituted by carboxyl or —COOZ, in which Z is hydrogen, $C_1$–$C_4$alkyl or phenyl or in which Z is $C_1$–$C_4$alkyl substituted by —(COO$^-$)$_n$M$^{n+}$, in which n is a number 1–3 and M is a metal ion from the first, second or third group of the Periodic Table or is Zn, Cu, Ni or Co, or M is a group N$^{n+}$(R$_2$)$_4$, in which $R_2$ is $C_1$–$C_8$alkyl or benzyl,
  if n is 2,
  $R_1$ is $C_1$–$C_{12}$alkylene, $C_4$–$C_{12}$alkenylene, xylylene or $C_1$–$C_{50}$alkylene which is unsubstituted or substituted by one to ten hydroxyl groups and which may be interrupted by one to twenty oxygen atoms,
  in the formulae B and B*,
  m is 1 to 4,
  if m is 1,
  $R_2$ is $C_1$–$C_{18}$alkyl, $C_3$–$C_{18}$alkyl interrupted by —COO—, $C_3$–$C_{18}$alkyl substituted by COOH or COO—, or $R_2$ is —CH$_2$(OCH$_2$CH$_2$)$_n$OCH$_3$, in which n is a number from 1 to 12, or $R_2$ is $C_5$–$C_{12}$cycloalkyl, $C_6$–$C_{12}$aryl which is unsubstituted or is substituted by one to four $C_1$–$C_4$alkyl, or
  $R_2$ is —NHR$_3$, in which R$_3$ is $C_1$–$C_{18}$alkyl, $C_5$–$C_{12}$cycloalkyl, $C_6$–$C_{12}$aryl which is unsubstituted or is substituted by one to four $C_1$–$C_4$alkyl, or $R_2$ is —$N(R_3)_2$, in which $R_3$ is $C_1$–$C_{18}$alkyl, $C_5$–$C_{12}$cycloalkyl, $C_6$–$C_{12}$aryl which is unsubstituted or is substituted by one to four $C_1$–$C_4$alkyl, if m is 2, $R_2$ is $C_1$–$C_{12}$alkylene, $C_4$–$C_{12}$alkenylene, xylylene, $C_2$–$C_{12}$alkylene interrupted by —COO—, $C_3$–$C_{18}$alkylene substituted by COOH or COO—, or $R_2$ is —$CH_2(OCH_2CH_2)_nOCH_2$—, in which n is a number from 1 to 12, or $R_2$ is $C_5$–$C_{12}$cycloalkylene, $C_7$–$C_{15}$aralkylene or $C_6$–$C_{12}$arylene, or $R_2$ is —$NHR_4NH$—, in which $R_4$ is $C_2$–$C_{18}$alkylene, $C_5$–$C_{12}$cycloalkylene, $C_8$–$C_{15}$aralkylene or $C_6$–$C_{12}$arylene, or $R_2$ is —$N(R_3)R_4N(R_3)$—, in which $R_3$ and $R_4$ are as defined above, or $R_2$ is —CO— or —NH—CO—NH—, if m is 3, $R_2$ is $C_3$–$C_8$alkanetriyl or benzenetriyl, or if m is 4, $R_2$ is $C_5$–$C_8$alkanetetrayl or benzenetetrayl, in the formulae C and C*, $R_{10}$ is hydrogen, $C_1$–$C_{18}$alkyl, $C_5$–$C_{12}$cycloalkyl, $C_7$–$C_{15}$aralkyl, $C_2$–$C_{18}$alkanoyl, $C_3$–$C_5$alkenoyl or benzoyl, x is 1 or 2, if x is 1, $R_{11}$ is hydrogen, $C_1$–$C_{18}$alkyl, $C_2$–$C_{18}$alkenyl, propargyl, glycidyl, $C_2$–$C_{50}$alkyl which is unsubstituted or substituted by one to ten hydroxyl groups and which may be interrupted by one to twenty oxygen atoms, or $R_{11}$ is $C_1$–$C_4$alkyl which is substituted by carboxyl or —COOZ, in which Z is hydrogen, $C_1$–$C_4$alkyl or phenyl, or in which Z is $C_1$–$C_4$alkyl which is substituted by —$(COO^-)_nM^{n+}$, in which n is a number from 1–3, and M is a metal ion from the first, second or third group of the Periodic Table or is Zn, Cu, Ni or Co, or M is a group $N^{n+}(R_2)_4$, in which $R_2$ is hydrogen, $C_1$–$C_8$alkyl or benzyl, or if x is 2, $R_{11}$ is $C_1$–$C_{12}$alkylene, $C_4$–$C_{12}$alkenylene, xylylene, $C_1$–$C_{50}$alkylene which is unsubstituted or is substituted by one to ten hydroxyl groups and which can be interrupted by one to twenty oxygen atoms, in the formulae D and D*, $R_{10}$ has the meaning given above, y is a number from 1 to 4, and $R_{12}$ has the meaning of $R_2$, In the formulae E and E*, k is 1 or 2, if k is 1, $R_{20}$ and $R_{21}$, independently of one another, are $C_1$–$C_{12}$alkyl, $C_2$–$C_{12}$alkenyl or $C_7$–$C_{15}$aralkyl, or $R_{20}$ is hydrogen, or $R_{20}$ and $R_{21}$ are together $C_2$–$C_8$alkylene which can be substituted by hydroxyl, or $C_4$–$C_{22}$acyloxyalkylene or if k is 2, $R_{20}$ and $R_{21}$ are together (—$CH_2$)$_2$C($CH_2$—)$_2$, in the formulae F and F*, $R_{30}$ is hydrogen, $C_1$–$C_{18}$-alkyl, benzyl, glycidyl or $C_2$–$C_6$-alkoxyalkyl, g is 1 or 2, if g is 1, $R_{31}$ has the meaning of $R_1$ if n is 1, if g is 2, $R_{31}$ has the meaning of $R_1$ if n is 2, in the formulae G and G*, $Q_1$ is —$NR_{41}$ or —O—, $E_1$ is $C_1$–$C_3$alkylene, or $E_1$ is —$CH_2$—$CH(R_{42})$—O—, in which $R_{42}$ is hydrogen, methyl or phenyl, or $E_1$ is —$(CH_2)_3$—NH— or $E_1$ is a direct bond, $R_{40}$ is hydrogen or $C_1$–$C_{18}$alkyl, $R_{41}$ is hydrogen, $C_1$–$C_{18}$alkyl, $C_5$–$C_{12}$cycloalkyl, $C_7$–$C_{15}$aralkyl, $C_6$–$C_{10}$aryl, or $R_{41}$ is —$CH_2$—CH($R_{42}$)—OH, in which $R_{42}$ is as defined above, in the formulae H and H*, p is 1 or 2, $T_4$ has the meaning of $R_{11}$ if x is 1 or 2, M and Y, independently of one another, are methylene or carbonyl, where M is, in particular, methylene and Y is carbonyl, in the formulae I and I*, these formulae are a repeating structural part of a polymer, in which $T_1$ is ethylene or propylene, or a repeating structural part derived from a copolymer of an α-olefin and alkyl acrylate or methacrylate, q is a number from 2 to 100, $Q_1$ is —$N(R_{41})$— or —O—, in which $R_{41}$ is as defined above, in the formulae J and J*, r is 1 or 2, $T_7$ has the meaning of $R_1$ if n is 1 or 2 in the formula A, in the formulae L and L*, u is 1 or 2, $T_{13}$ has the meaning of $R_1$ if n is 1 or 2 in the formula A, with the proviso that $T_{13}$ is not hydrogen if u is 1, in the formulae M and M*, $E_1$ and $E_2$ are —CO— or —$N(E_5)$—, in which $E_5$ is hydrogen, $C_1$–$C_{12}$alkyl or $C_4$–$C_{22}$alkoxycarbonylalkyl, where $E_1$ and $E_2$ have different meanings, $E_3$ is hydrogen, $C_1$–$C_{30}$alkyl, phenyl which is unsubstituted or substituted by chlorine or $C_1$–$C_4$alkyl, naphthyl which is unsubstituted or substituted by chlorine or $C_1$–$C_4$alkyl, or $C_7$–$C_{12}$phenylalkyl which is unsubstituted or substituted by $C_1$–$C_4$alkyl, $E_4$ is hydrogen, $C_1$–$C_{30}$alkyl, phenyl, naphthyl or $C_7$–$C_{12}$phenylalkyl, or $E_3$ and $E_4$ together form a $C_4$–$C_{17}$polymethylene which is unsubstituted or substituted by one to four $C_1$–$C_4$alkyl radicals, in particular by methyl, in the formulae N and N*, $R_1$ has the meaning of $R_1$ in the formula A if n is 1, $G_3$ is the direct bond, $C_1$–$C_{12}$alkylene, phenylene or —NH—$G_1$—NH—, in which $G_1$ is $C_1$–$C_{12}$alkylene, in the formulae O and O*, $R_{10}$ has the meaning of $R_{10}$ in the formula C, in the formulae P and P*, $E_6$ is an aliphatic or aromatic tetravalent radical, in particular neopentanetetrayl or benzenetetrayl, in the formulae T and T*, $R_{51}$ is hydrogen, $C_1$–$C_{18}$alkyl, $C_5$–$C_{12}$cycloalkyl or $C_6$–$C_{10}$aryl, $R_{52}$ is hydrogen or $C_1$–$C_{18}$alkyl, or $R_{51}$ and $R_{52}$ together are $C_4$–$C_8$alkylene, f is 1 or 2, if f is 1, $R_{50}$ has the meaning of $R_{11}$ in the formula C if x is 1, or $R_{50}$ is —$(CH_2)_z COOR_{54}$, in which z is a number from 1 to 4 and $R_{54}$ is hydrogen or $C_1$–$C_{18}$alkyl, or $R_{54}$ is a metal ion from the first, second or third group of the Periodic Table or is —$N(R_{55})_4$, in which $R_{55}$ is hydrogen, $C_1$–$C_{12}$alkyl or benzyl, if f is 2, $R_{50}$ has the meaning of $R_{11}$ in the formula C if x is 2, in the formulae U and U*, $R_{53}$, $R_{54}$, $R_{55}$ and $R_{56}$, independently of one another, are $C_1$–$C_4$alkyl or together form pentamethylene, in the formulae V and V*, $R_{57}$, $R_{58}$, $R_{59}$ and $R_{60}$, independently of one another, are $C_1$–$C_4$alkyl or together form pentamethylene, in the formulae W and W*, $R_{61}$, $R_{62}$, $R_{63}$ and $R_{64}$, independently of one another, are $C_1$–$C_4$alkyl, or together form pentamethylene, $R_{65}$ is $C_1$–$C_5$alkyl, M is hydrogen or oxygen, in which, in the formulae X to CC and X* to CC*, n is from 2 to 3, $G_1$ is hydrogen, methyl, ethyl, butyl or benzyl, m is a number from 1 to 4, x is a number from 1 to 4, if x is 1, $R_1$ and $R_2$, independently of one another, are $C_1$–$C_{18}$ alkyl which is unsubstituted or substituted by one to five hydroxyl groups and which may be interrupted by one to five oxygen atoms, or $C_5$–$C_{12}$cycloalkyl, $C_7$–$C_{15}$aralkyl, $C_6$–$C_{10}$aryl which is unsubstituted or substituted by one to three $C_1$–$C_8$alkyl, or $R_1$ is hydrogen, or $R_1$ and $R_2$ together are tetramethyl, pentamethylene, hexamethylene or 3-oxapentamethylene, if x is 2, $R_1$ is hydrogen, $C_1$–$C_8$alkyl which is unsubstituted or substituted by hydroxyl and may be interrupted by one or two oxygen atoms, $R_2$ is $C_2$–$C_{18}$alkylene which is unsubstituted or substituted by one to five hydroxyl groups and may be interrupted by one to five oxygen atoms, o-, m- or p-phenylene which is unsubstituted or substituted by one or two $C_1$–$C_4$alkyl, or $R_2$ is —$(CH_2)_k O[(CH_2)_k O]_h(CH_2)_k$—, in which k is a number from 2 to 4 and h is a number 1 to 40, or $R_1$ and $R_2$ together with the two N atoms to which they are bonded form piperazine-1,4-diyl, if x is 3, $R_1$ is hydrogen, $R_2$ is $C_4$–$C_8$alkylene interrupted by a nitrogen atom, if x is 4, $R_1$ is hydrogen, $R_2$ is $C_6$–$C_{12}$alkylene interrupted by two nitrogen atoms, $R_3$ is hydrogen, $C_1$–$C_8$alkyl which is unsubstituted or substituted by hydroxyl and may be interrupted by one or two oxygen atoms, p is 2 or 3, and Q is an alkali metal salt, ammonium or $N^+(G_1)_4$ in which $G_1$ is as defined above and in the formulae DD and DD* m is 2 or 3, if m is 2,

G is —$(CH_2CHR—O)_r CH_2 CHR$— in which or is a number from 0 to 3, and R is hydrogen or methyl and if m is 3, G is glyceryl, in the formulae EE and EE*

$G_2$ or is —CN, —$CONH_2$ or —$COOG_3$, in which $G_3$ is hydrogen, $C_1$–$C_{18}$alkyl or phenyl, X is an inorganic or organic anion, where the total amount of the cations h corresponds to the total amount of the anions j; and in which, in the formulae III to IIIc, $A_{11}$ is $OR_{101}$ or $NR_{111}R_{112}$, $R_{101}$ is $C_2$–$C_4$alkenyl, propargyl, glycidyl, $C_2$–$C_6$alkyl which is unsubstituted or substituted by one to three hydroxyl groups and may be interrupted by one or two oxygen atoms, or $R_{101}$ is $C_1$–$C_4$alkyl which is substituted by carboxyl or an alkali metal, ammonium or $C_1$–$C_4$alkylammonium salts, or $R_{101}$ is alkyl which is substituted by —$COOE_{10}$, in which $E_{10}$ is methyl or ethyl, $R_{102}$ is $C_3$–$C_5$alkyl which is interrupted by —COO— or by —CO—, or $R_{102}$ is —$CH_2(OCH_2CH_2)_c OCH_3$, in which c is a number from 1 to 4, or $R_{102}$ is —$NHR_{103}$, in which $R_{103}$ is $C_1$–$C_4$alkyl, a is a number from 2 to 4, if a is 2, $T_{11}$ is —$(CH_2CHR_{100}—O)_d CH_2 CHR_{100}$—, in which d is 0 or 1, and $R_{100}$ is hydrogen or methyl, if a is 3, $T_{11}$ is glyceryl, if a is 4, $T_{11}$ is neopentanetetrayl, b is 2or 3, if b is 2, $G_{11}$ is —$(CH_2CHR_{100}—O)_e CH_2 CHR_{100}$—, in which e is a number from 0 to 3 and $R_{100}$ is hydrogen or methyl, and if b is 3, $G_{11}$ is glyceryl, $R_{111}$ is hydrogen, $C_1$–$C_4$alkyl which is unsubstituted or substituted by one or two hydroxyl groups and may be interrupted by one or two oxygen atoms, $R_{112}$ is —CO—$R_{113}$, in which $R_{113}$ has the meaning of $R_{111}$ or $R_{113}$ is —$NHR_{114}$, in which $R_{114}$ is $C_1$–$C_4$alkyl which is unsubstituted or substituted by one or two hydroxyl groups and/or by $C_1$–$C_2$-alkoxy, or $R_{111}$ and $R_{112}$ together are —CO—$CH_2CH_2$—CO—, —CO—CH=CH—CO— or —$(CH_2)_6$—CO—, with the proviso that if $R_{113}$ is $C_1$–$C_4$alkyl, $R_{111}$ is not hydrogen.

Important dye stabilizers for the process according to the invention are the compounds of the formulae A, A*, B, B*, C, C*, D, D*, Q, Q*, R, R*, S or S*, X, X*, Y, Y*, Z and Z*, in which E is oxyl or hydroxyl, and R is hydrogen, in the formulae A and A* n is 1 or 2, if n is 1, $R_1$ is hydrogen, $C_1$–$C_6$alkyl, $C_2$–$C_6$alkenyl, propargyl, glycidyl, $C_2$–$C_{20}$alkyl which is unsubstituted or substituted by one to five hydroxyl groups and may be interrupted by one to ten oxygen atoms, or $R_1$ is $C_1$–$C_4$alkyl which is substituted by carboxyl or —COOZ, in which Z is hydrogen or $C_1$–$C_4$alkyl, if n is 2, $R_1$ is $C_1$–$C_8$alkylene, $C_4$–$C_8$alkenylene, $C_2$–$C_{20}$alkylene which is unsubstituted or substituted by one to five hydroxyl groups and may be interrupted by one to ten oxygen atoms, in the formulae B and B* m is 1 or 2, if m is 1, $R_2$ is $C_1$–$C_4$alkyl, or $R_2$ is $CH_2(OCH_2CH_2)_nOCH_3$, in which n is a number from 1 to 12, or $R_2$ is phenyl which is unsubstituted or substituted by one to three methyl groups, or $R_2$ is —$NHR_3$, in which $R_3$ is $C_1$–$C_4$alkyl or phenyl which is unsubstituted or is substituted by one or two methyl groups, if m is 2, R is $C_1$–$C_8$alkylene, $C_4$–$C_8$alkenylene, or $R_2$ is —$CH_2(OCH_2CH_2)_nOCH_2$—, in which n is a number from 1 to 12, $R_2$ is $NHR_4NH$, in which $R_4$ is $C_2$–$C_6$alkyl, $C_8$–$C_{15}$aralkylene or $C_6$–$C_{12}$arylene, or $R_2$ is —CO— or —NHCONH, in the formulae C and C*, $R_{10}$ is hydrogen or $C_1$–$C_3$alkanoyl, x is 1 or 2, if x is 1, $R_{11}$ is hydrogen, $C_1$–$C_6$alkyl or glycidyl, or $R_{11}$ is $C_1$–$C_4$alkyl which is substituted by carboxyl or COOZ, in which Z is hydrogen or $C_1$–$C_4$alkyl, if x is 2, $R_{11}$ is $C_1$–$C_6$alkylene, in the formulae D and D*, $R_{10}$ is hydrogen, y is 1 or 2, and $R_{12}$ has the meaning given above for $R_2$, in the formulae Y, Y*, Z and Z*, x is 1 or 2, if x is 1, $R_1$ and $R_2$, independently of one another, are $C_1$–$C_4$alkyl, or $R_1$ and $R_2$ together form tetramethylene or pentamethylene, $R_2$ is hydrogen or $C_1$–$C_4$alkyl substituted by hydroxyl, if x is 2, $R_1$ is hydrogen, or $C_1$–$C_4$alkyl substituted by hydroxyl, $R_2$ is $C_2$–$C_6$alkylene, and $R_3$ is as defined above.

Particularly important dye stabilizers for the process according to the invention are the compounds of the formulae A, A*, B, B*, C, C*, D, D*, Q, Q*, R and R*, in which E is oxyl or hydroxyl and R is hydrogen, in the formulae A and A*, h is 1, $R_1$ is hydrogen, $C_1$–$C_4$alkyl, glycidyl, $C_2$–$C_4$alkyl which is unsubstituted or substituted by one or two hydroxyl groups and may be interrupted by one or two oxygen atoms, or $R_1$ is $C_1$–$_4$alkyl which is substituted by —COOZ, in which Z is hydrogen or $C_1$–$C_4$alkyl, in the formulae B and B*, m is 1 or 2, $R_2$ is $C_1$–$C_4$alkyl, or $R_2$ is $CH_2(OCH_2CH_2)_nOCH_3$, in which n is a number 1 to 4, if m is 2, R is $C_1$–$C_8$alkylene, in the formulae C and C*, $R_{10}$ is hydrogen or $C_1$–$C_2$alkanoyl, x is 1 or 2, if x is 1, $R_{11}$ is hydrogen, $C_1$–$C_4$alkyl or glycidyl, or $R_{11}$ is $C_1$–$C_4$alkyl which is substituted by —COOZ, in which Z is hydrogen or $C_1$–$C_4$alkyl, if x is 2, $R_{11}$ is $C_1$–$C_6$alkylene, in the formulae D and D*, $R_{10}$ is hydrogen, y is 1 or 2, and $R_{12}$ has the meaning of $R_2$.

Very particularly important dye stabilizers for the process according to the invention are the compounds:

(a) bis(1-oxyl-2,2,6,6-tetramethylpiperidin-4-yl)sebacate;
(b) bis(1-hydroxy-2,2,6,6-tetramethylpiperidin-4-yl) sebacate;
(c) 1-hydroxy-2,2,6,6-tetramethyl-4-acetoxypiperidinium citrate;
(d) 1-oxyl-2,2,6,6-tetramethyl-4-acetamidopiperidine;
(e) 1-hydroxy-2,2,6,6-tetramethyl-4-acetamidopiperidine;
(f) 1-hydroxy-2,2,6,6-tetramethyl-4-acetamidopiperidinium bisulfate;
(g) 1-oxyl-2,2,6,6-tetramethyl-4-oxopiperidine;
(h) 1-hydroxy-2,2,6,6-tetramethyl-4-oxopiperidine;
(i) 1-hydroxy-2,2,6,6-tetramethyl-4-oxopiperidinium acetate;
(j) 1-oxyl-2,2,6,6-tetramethyl-4-methoxypiperidine;
(k) 1-hydroxy-2,2,6,6-tetramethyl-4-methoxypiperidine;
(l) 1-hydroxy-2,2,6,6-tetramethyl-4-methoxypiperidinium acetate;
(m) 1-oxyl-2,2,6,6-tetramethyl-4-acetoxypiperidine;
(n) 1-hydroxy-2,2,6,6-tetramethyl-4-acetoxypiperidine;
(o) 1-oxyl-2,2,6,6-tetramethyl-4-propoxypiperidine;
(p) 1-hydroxy-2,2,6,6-tetramethyl-4-propoxy-piperidinium acetate;
(q) 1-hydroxy-2,2,6,6-tetramethyl-4-propoxypiperidine;
(r) 1-oxyl-2,2,6,6-tetramethyl-4-(2-hydroxy-4-oxapentoxy) piperidine;
(s) 1-hydroxy-2,2,6,6-tetramethyl-4-(2-hydroxy-4-oxapentoxy)piperidinium acetate;
(t) 1-oxyl-2,2,6,6-tetramethyl-4-hydroxypiperidine;
(u) 1-hydroxy-2,2,6,6-tetramethyl-4-hydroxypiperidine;
(v) 1-hydroxy-2,2,6,6-tetramethyl-4-hydroxypiperidinium chloride;
(w) 1-hydroxy-2,2,6,6-tetramethyl-4-hydroxypiperidinium acetate;
(x) 1-hydroxy-2,2,6,6-tetramethyl-4-hydroxypiperidinium bisulfate;
(y) 1-hydroxy-2,2,6,6-tetramethyl-4-hydroxypiperidinium citrate;
(z) bis(1-hydroxy-2,2,6,6-tetramethyl-4-hydroxypiperidinium)citrate;
(aa) tris(1-hydroxy-2,2,6,6-tetramethyl-4-hydroxypiperidinium)citrate;
(bb) tetra(1-hydroxy-2,2,6,6-tetramethyl-4-hydroxypiperidinium)ethylenediaminetetraacetate;

(cc) tetra(1-hydroxy-2,2,6,6-tetramethyl-4-acetamidopiperidinium)ethylenediaminetetraacetate;
(dd) tetra(1-hydroxy-2,2,6,6-tetramethyl-4-oxopiperidinium)ethylenediaminetetraacetate;
(ee) penta(1-hydroxy-2,2,6,6-tetramethyl-4-hydroxypiperidinium)diethylenetriaminepentaacetate;
(ff) penta(1-hydroxy-2,2,6,6-tetramethyl-4-acetamidopiperidinium)diethylenetriaminepentaacetate;
(gg) penta(1-hydroxy-2,2,6,6-tetramethyl-4-oxopiperidinium)diethylenetriaminepentaacetate;
(hh) tri(1-hydroxy-2,2,6,6-tetramethyl-4-hydroxypiperidinium)nitrilotriacetate;
(ii) tri(1-hydroxy-2,2,6,6-tetramethyl-4-acetamidopiperidinium)nitrilotriacetate;
(jj) tri(1-hydroxy-2,2,6,6-tetramethyl-4-oxopiperidinium) nitrilotriacetate;
(kk) penta(1-hydroxy-2,2,6,6-tetramethyl-4-hydroxypiperidinium) diethylenetriaminepentamethylenephosphonate;
(ll) penta(1-hydroxy-2,2,6,6-tetramethyl-4-acetamidopiperidinium) diethylenetriaminepentamethylenephosphonate;
(mm) penta(1-hydroxy-2,2,6,6-tetramethyl-4-oxopiperidinium) diethylenetriaminepentamethylenephosphonate.

Preferred dye stabilizers in the process according to the invention are the compounds 1-oxyl-2,2,6,6-tetramethyl-4-hydroxypiperidine; 1-hydroxy-2,2,6,6-tetramethyl-4-hydroxypiperidine; 1-hydroxy-2,2,6,6-tetramethyl-4-hydroxypiperidinium chloride; 1-hydroxy-2,2,6,6-tetramethyl-4-hydroxypiperidinium acetate; 1-hydroxy-2,2,6,6-tetramethyl-4-hydroxypiperidinium bisulfate; 1-hydroxy-2,2,6,6-tetramethyl-4-hydroxypiperidinium citrate; bis(1-hydroxy-2,2,6,6-tetramethyl-4-hydroxypiperidinium)citrate; tris(1-hydroxy-2,2,6,6-tetramethyl-4-hydroxypiperidinium)citrate; tetra(1-hydroxy-2,2,6,6-tetramethyl-4-hydroxypiperidinium) ethylenediaminetetraacetate; tetra(1-hydroxy-2,2,6,6-tetramethyl-4-acetamidopiperidinium) ethylenediaminetetraacetate; tetra(1-hydroxy-2,2,6,6-tetramethyl-4-oxopiperidinium) ethylenediaminetetraacetate; penta(1-hydroxy-2,2,6,6-tetramethyl-4-hydroxypiperidinium) diethylenetriaminepentaacetate; penta(1-hydroxy-2,2,6,6-tetramethyl-4-acetamidopiperidinium) diethylenetriaminepentaacetate and penta(1-hydroxy-2,2,6,6-tetramethyl-4-oxopiperidinium) diethylenetriaminepentaacetate.

The dye stabilizer which is very particularly preferably used in the process according to the invention is the compound 1-oxyl-2,2,6,6-tetramethyl-4-hydroxypiperidine of the formula

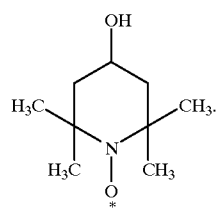

(IIId)

The compounds given above and used as dye stabilizers, and the preparation thereof are known, for example, from EP-A-0 943 665.

The present invention further provides for the use of the dye stabilizers of the formulae

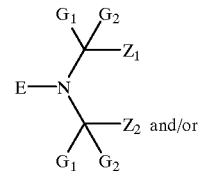

(I)

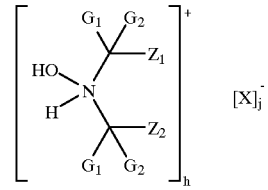

(II)

as compositions for protecting stained woods against the effect of light and heat, where $G_1$, $G_2$, $Z_1$, $Z_2$, E, X, h and j have the meanings and preferred meanings given above.

The dye stabilizers of the formula (I) or (II) are usually used in an amount of from 1 to 10% by weight, preferably 2 to 6% by weight, based on the weight of the wood to be treated.

Dyes which are suitable for use in the process according to the invention for the staining of wood are all customary dyes used in wood staining. In particular, acid dyes, and also cationic dyes, reactive dyes, and metal complex dyes are suitable for use in the process according to the invention.

Acid dyes are, for example, those dyes described in the Colour Index, 3rd edition (3rd revision 1987 including Additions and Amendments up to No. 85) under "Acid Dyes". The anionic dyes which can be used may belong to a wide variety of dye classes and may contain one or more sulfonic acid groups. Examples are triphenylmethane dyes with at least two sulfonic acid groups, heavy-metal-free monoazo and disazo dyes each with one or more sulfonic acid groups and heavy-metal-containing, namely copper-, chromium-, nickel- or cobalt-containing monoazo, bisazo, azomethine and formazan dyes, in particular metallized dyes which contain two molecules of azo dye or one molecule of azo dye and one molecule of azomethine dye bonded to a metal atom, especially those which contain mono- and/or disazo dyes and/or azomethine dyes as ligands, and a chromium or cobalt ion as central atom, and also anthraquinone dyes, in particular 1-amino-4-arylaminoanthraquinone-2-sulfonic acids and 1,4-diarylamino- or 1-cycloalkylamino-4-arylaminoanthraquinonesulfonic acids.

Examples of cationic dyes are those dyes which are described in the Colour Index, 3rd edition, (3rd revision 1987 including additions and amendments up to No.85) under "Basic Dyes". The cationic dyes which can be used may belong to a very wide variety of classes of dye. In particular, the cationic monoazo, anthraquinone and oxazine dyes are used in the process according to the invention.

Metal complex dyes are to be understood as meaning, for example, the metal-containing acid dyes described above under acid dyes, and also 1:1 or 1:2-metal complex dyes which do not have water-solubilizing groups, in particular do not have sulfo groups. Of the metal complex dyes, particular importance is given to the copper and cobalt complexes of azo, quinone oxime and hydroxyanthraquinone dyes.

The reactive dyes are, for example, those dyes described in the Colour Index, 3rd edition (3rd Revision 1987 including Additions and Amendments up to No.85) under "Reactive Dyes".

Examples of reactive dyes are dyes from the group of the monoazo, disazo, polyazo, metal complex azo, anthraquinone, phthalocyanine, formazan or dioxazine dyes which contain at least one reactive group. These dyes preferably also contain at least one sulfo group.

Reactive groups are understood as meaning radicals which are reactive towards fibres and which are able to react with the hydroxyl groups of cellulose, the amino, carboxyl, hydroxyl and mercapto groups of wool or silk, or with the amino or, where appropriate, the carboxyl groups of synthetic polyamides to form chemical covalent bonds. The reactive groups are usually joined to the dye radical directly or via a bridging element. Suitable reactive groups are, for example, those which have at least one substituent which can be detached from an aliphatic, aromatic or heterocyclic radical, or those in which the radicals have a radical suitable for reaction with the fibre material, for example a halogenotriazinyl, halogenopyrimidinyl or vinyl radical.

Of particular preference in the process according to the invention are the dyes of the formulae

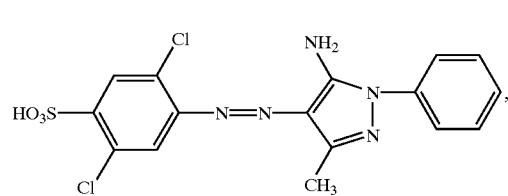
(1)

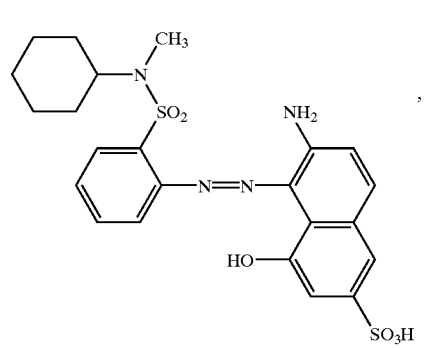
(2)

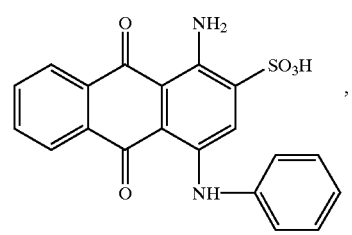
(3)

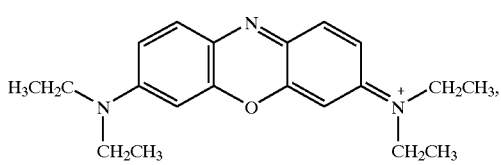
(4)

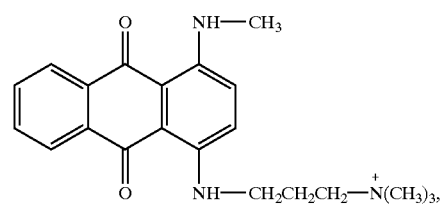
(5)

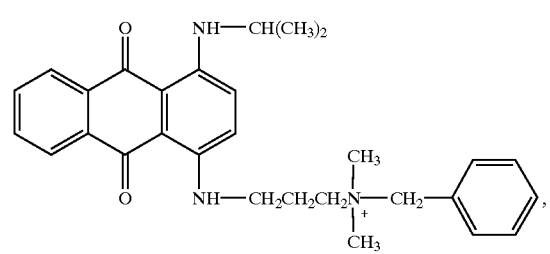
(6)

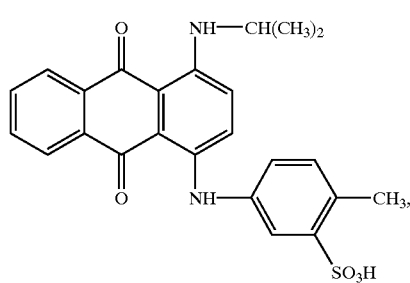
(7)

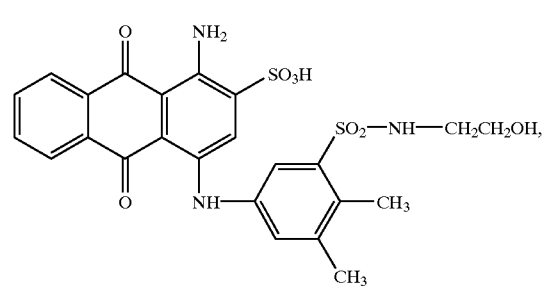
(8)

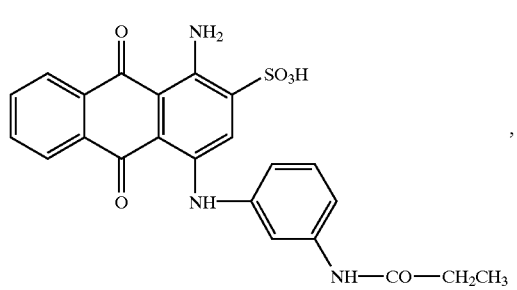
(9)

-continued
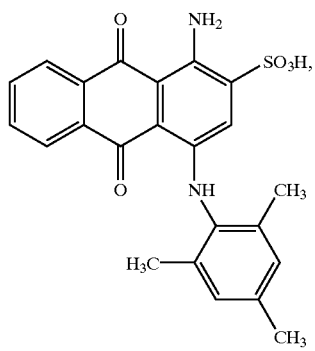
(10)
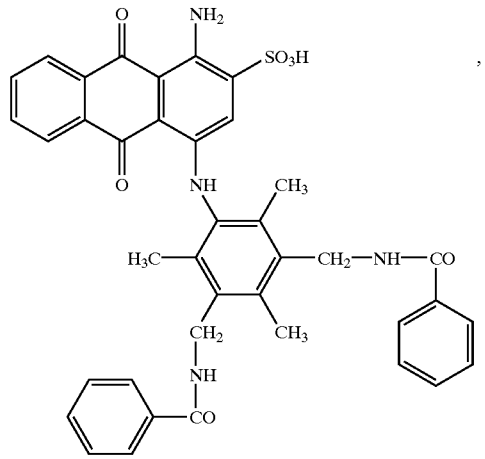
(11)
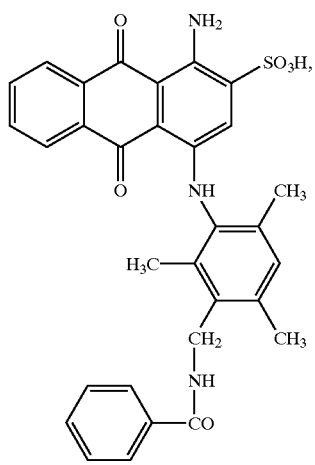
(12)
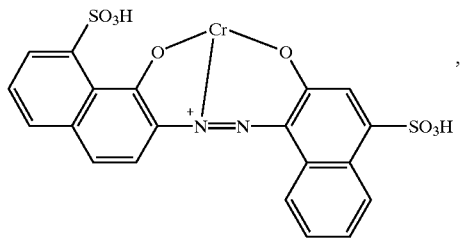
(13)
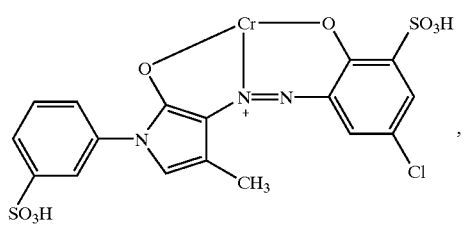
(14)
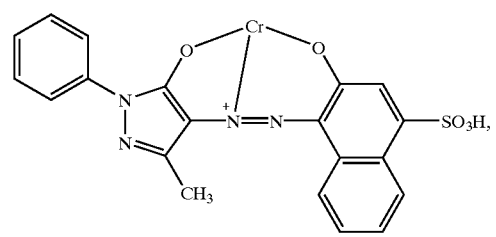
(15)
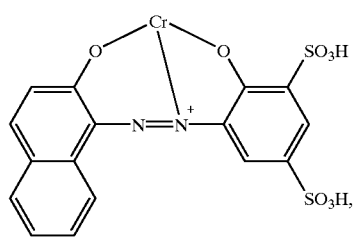
(16)
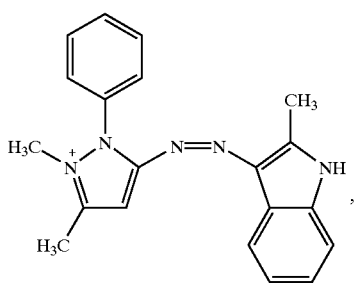
(17)

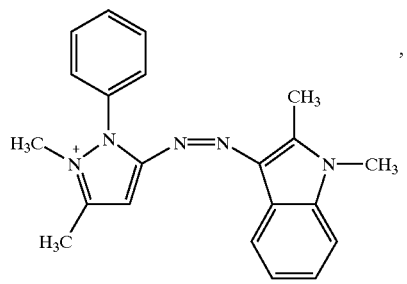
(18)
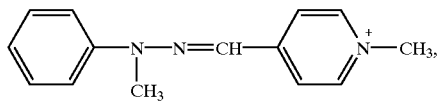
(19)
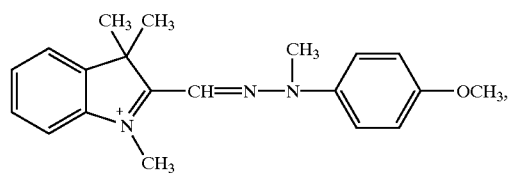
(20)
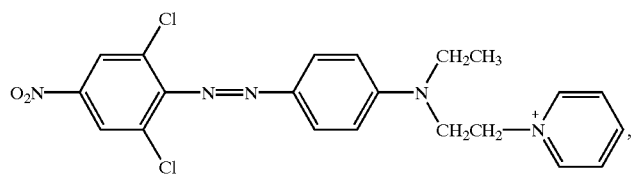
(21)
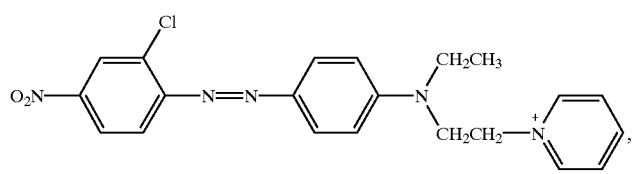
(22)
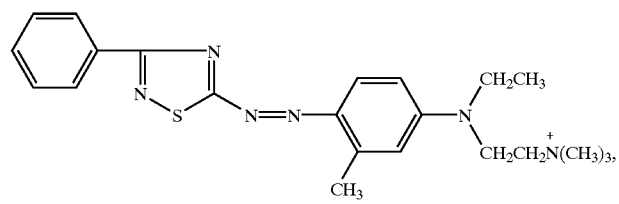
(23)
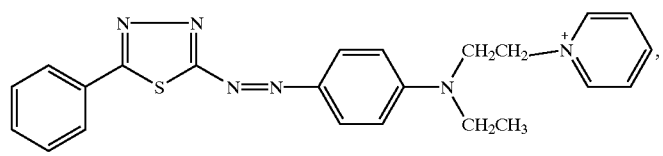
(24)
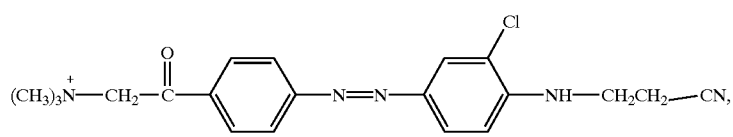
(25)

(26) 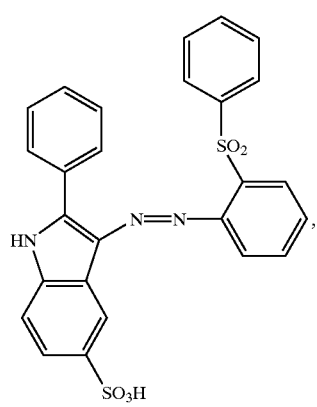
(27) 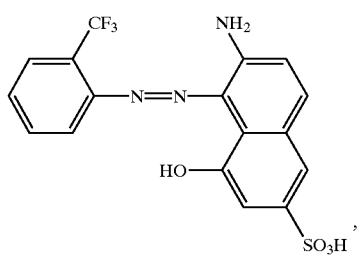
(28) 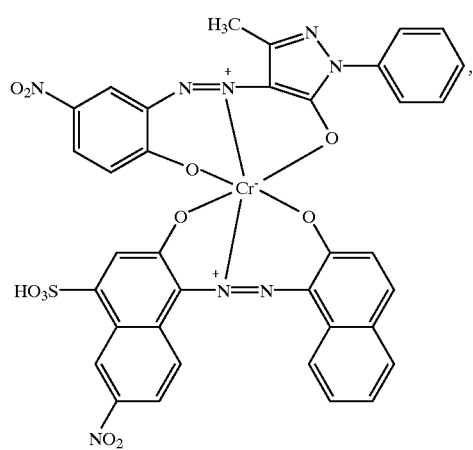
(29) 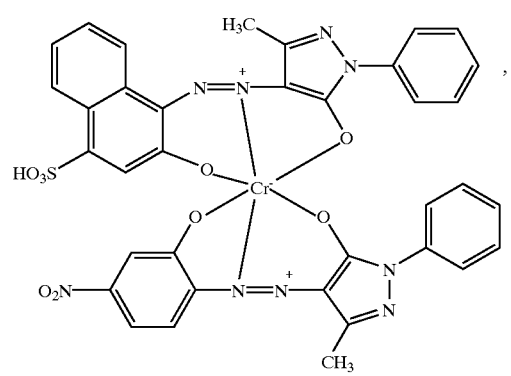
(30) 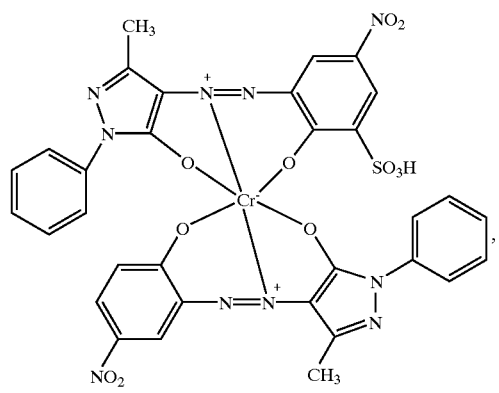
(31) 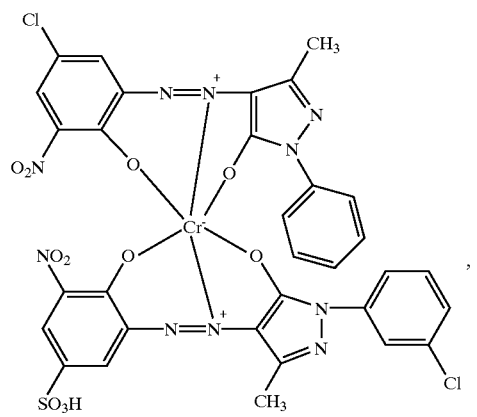

(32)
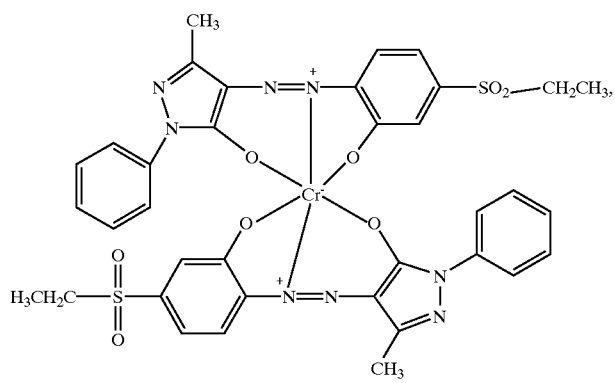
(33)
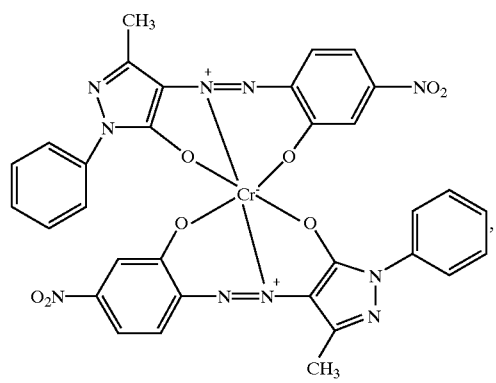
(34)
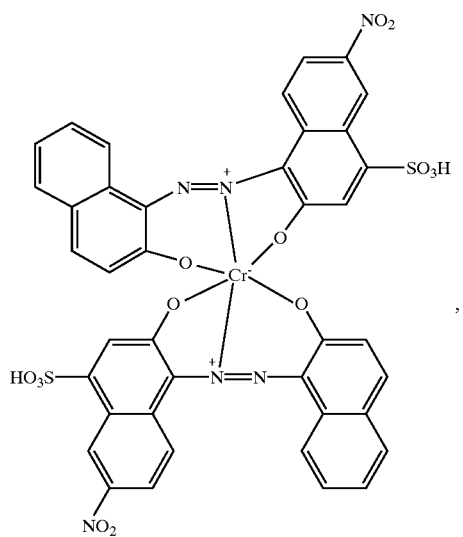
(35)
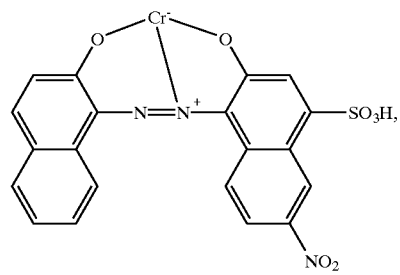
(36)
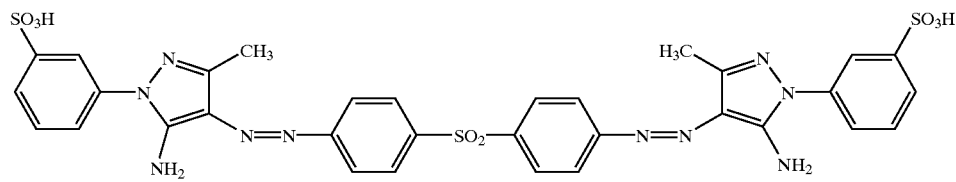

-continued
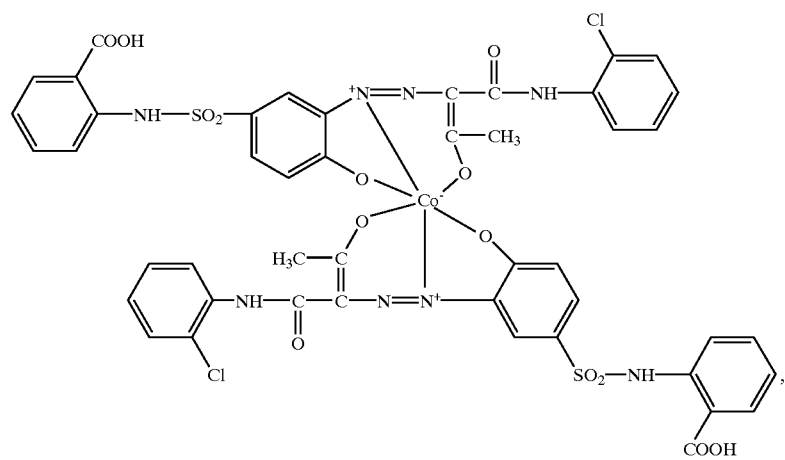
(37)
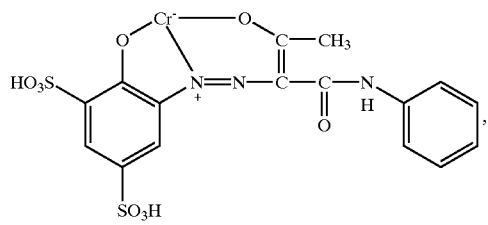
(38)
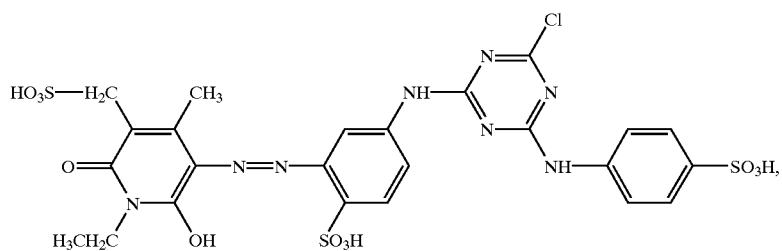
(39)
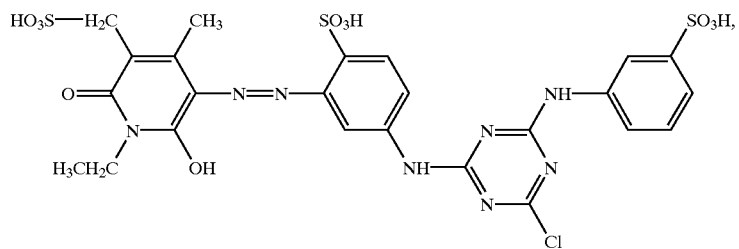
(40)
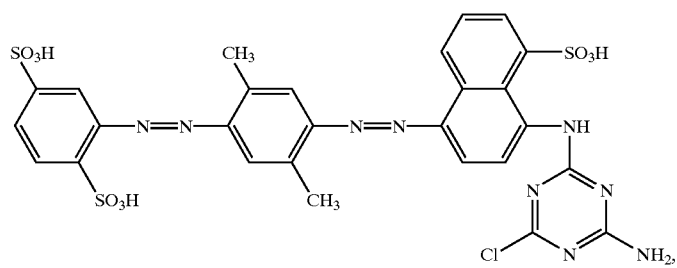
(41)

-continued
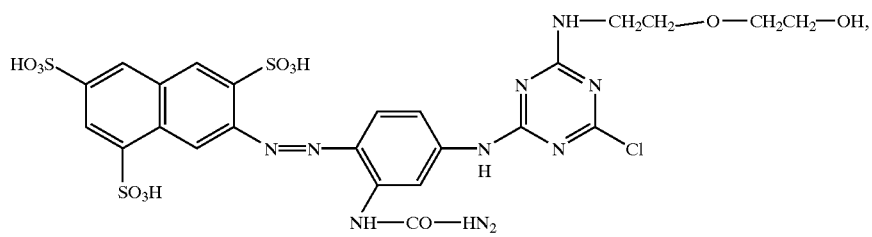
(42)
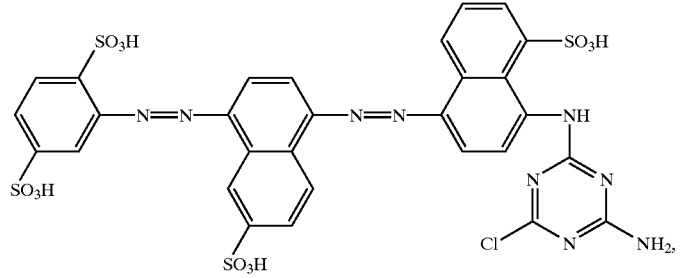
(43)
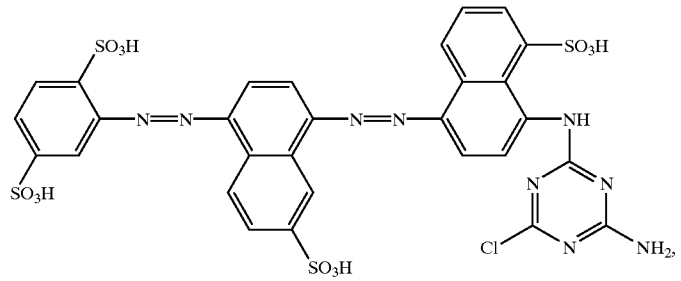
(44)
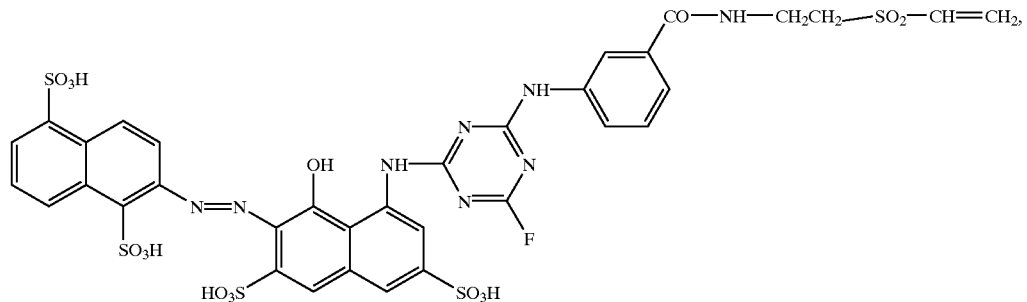
(45)
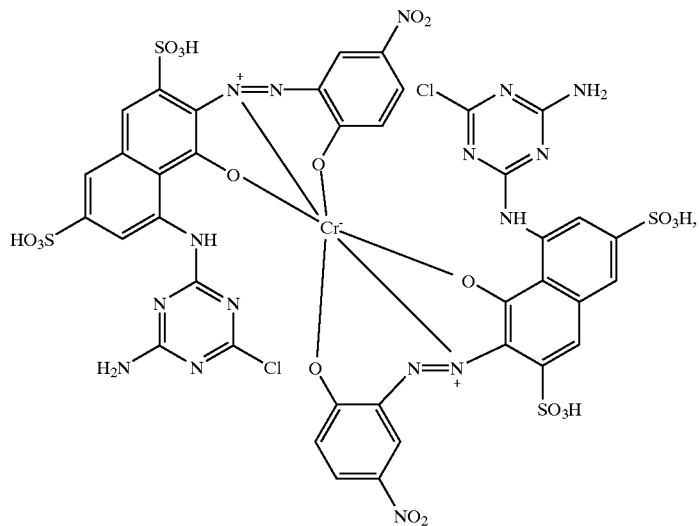
(46)

-continued
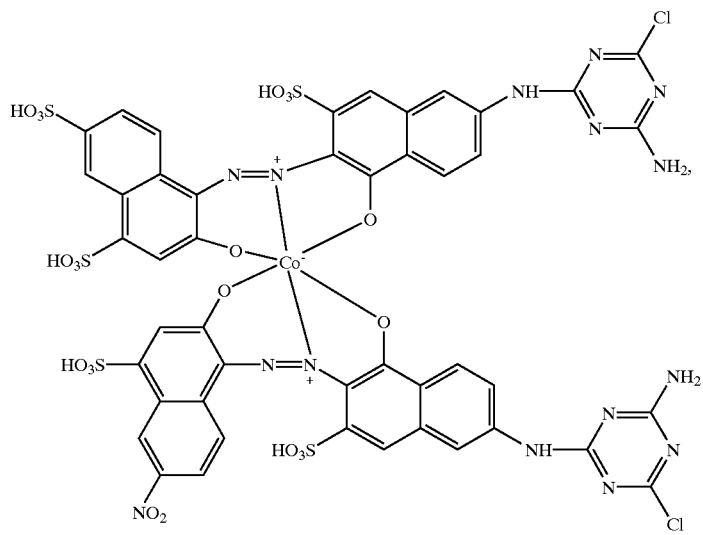
(47)
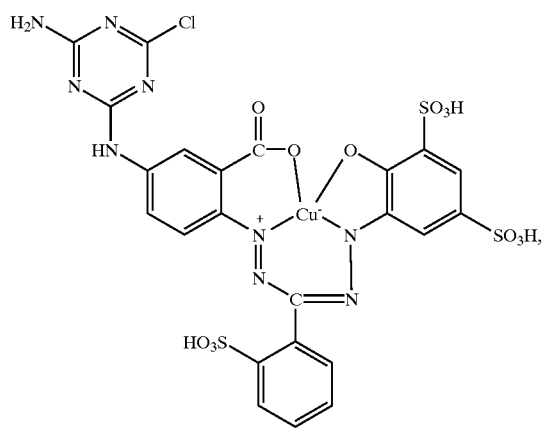
(48)
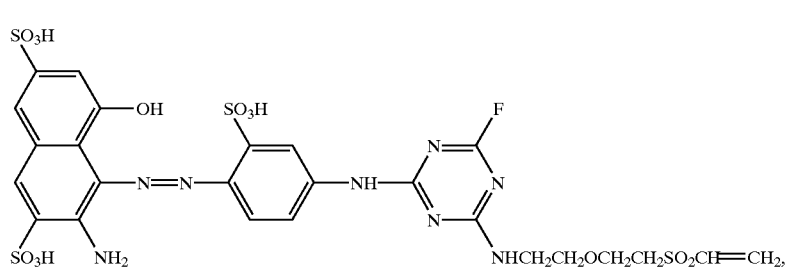
(49)
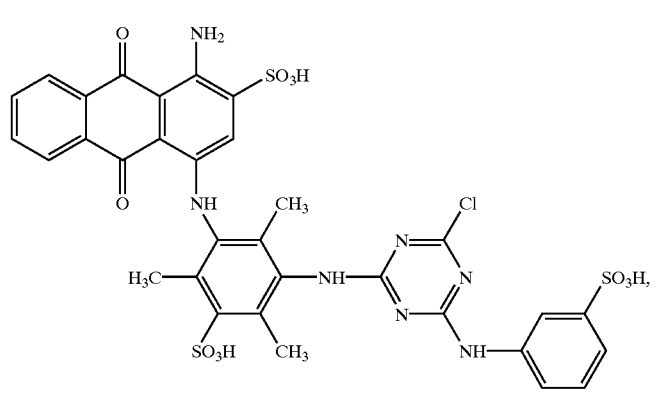
(50)

(51)

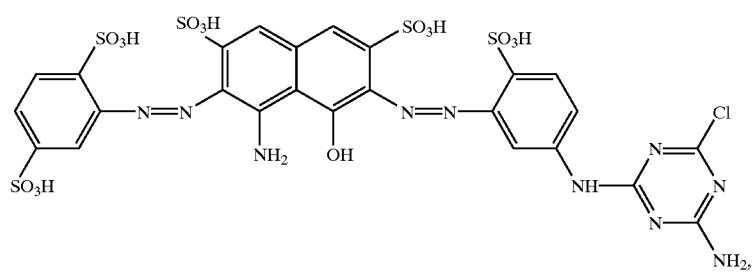

(52)

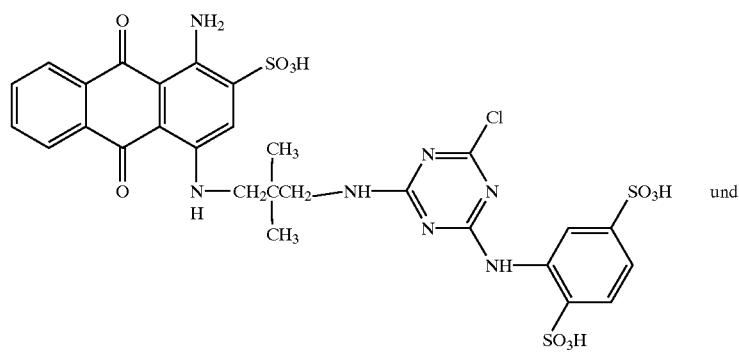

und (53)

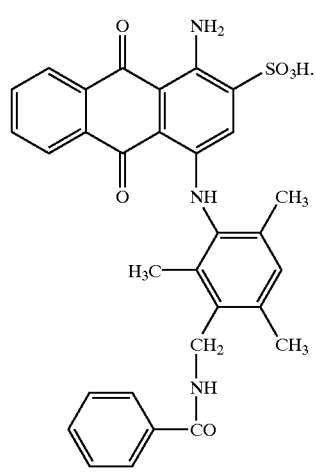

The dyes of the formulae (1) to (53) are known.

Very particular preference is given in the process according to the invention to the dyes of the formulae (1), (2), (3), (8), (12), (26), (27), (28), (29), (30), (31), (34), (42), (46), (48), (49), (50), (51), (52) and (53).

The present invention further provides an aqueous wood stain comprising at least one dye suitable for the staining of wood and at least one dye stabilizer of the formulae (I) or (II)

(I)

$$\begin{array}{c} G_1 \quad G_2 \\ \diagdown \! \diagup \\ \phantom{E-N}\!\!-Z_1 \\ E-N \\ \phantom{E-N}\!\!-Z_2 \\ \diagup \! \diagdown \\ G_1 \quad G_2 \end{array}$$

-continued (II)

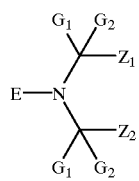

where for $G_1$, $G_2$, $Z_1$, $Z_2$, E, X, h and j, and for the dyes used, the meanings and preferred meanings given above apply.

The wood stain according to the invention can also comprise further additives, for example UV absorbers, fungicides or insecticides. Examples of UV absorbers are the UV absorbers of the benzotriazole, 2-hydroxybenzophenone, 2-hydroxy-1,3,5-triazine and oxalanilide series. Examples of fungicides are 1-chloronaphthalene and pentachlorophenol. Examples of insecticides are DDT, cypermethrin, propiconazole and parathion.

Furthermore, the wood stain can comprise organic solvents, in particular glycols, polyglycols, ketones or glycol ethers, and especially alcohols.

Wood which can be stained and treated with the dye stabilizer used according to the invention is primarily to be understood as meaning shaped wooden bodies with extensive surfaces, for example wooden planks, plywood and chipboard, which may be veneered, carved wooden objects, and wooden sections glued, nailed or screwed together to give, for example, furniture, but also wood in finely divided form, for example wood chips or sawdust. Also suitable for the process according to the invention are thin wooden boards which are prepared by continuously shaving tree-trunks and which are joined together, e.g. glued together, only after they have been stained to give thicker boards or workpieces.

The treatment of the wood to be stained can be carried out, for example, by firstly staining the wood with a dye, optionally drying it and then treating it with a dye stabilizer of the formula (I) or (II), or by treating the wood to be stained directly with a wood stain comprising a dye and a dye stabilizer of the formula (I) or (II). The treatment of the stained wood with the dye stabilizer of the formula (I) or (II) can be carried out, for example, by treating the stained and optionally dried wood with an aqueous formulation of the dye stabilizer of the formula (I) or (II), or by incorporating the dye stabilizer of the formula (I) or (II) into a commercially available nitrocellulose lacquer with which the stained and optionally dried wood is then coated.

Depending on the nature and the type of wood, and the contact times of the wood stains comprising a dye stabilizer or a dye stabilizer and a dye, the dye can lie directly on the surface of the wood material or, advantageously, can penetrate deeper inside the wood.

The wood stain according to the invention is applied to the wood using customary methods, for example by immersing the wood in a bath of the wood stain, by paint-brushing, spraying or by knife-coating. The exposure time here can be up to several hours, and the temperature of the wood stain bath can generally be between 20 and about 110° C. When the treatment is complete, the wooden objects are generally dried in the air at room temperature. The treated wood can, however, also be dried at elevated temperatures up to about 100° C., e.g. in a convection drying cabinet.

The wood stain according to the invention can be used to treat all customary types of wood, for example pine, spruce, fir, oak, ash, beech, maple, walnut tree, pear tree, teak, mahogany, chestnut, birch tree, larch, hazelnut, lime tree, willow, poplar, elm, Scots pine, plane tree, obeche or aspen.

The examples below serve to illustrate the invention. Unless stated otherwise, the parts are parts by weight and the percentages are percentages by weight. The temperatures are given in degrees Celsius. The relationship between parts by weight and parts by volume is the same as that between grams and cubic centimetres.

EXAMPLE 1

A 100 ml bomb of a pressure dyeing apparatus is charged with a liquor consisting of 80 ml of water (adjusted to a pH between 6.5 and 7.0) and 0.08 g of the dye of the formula

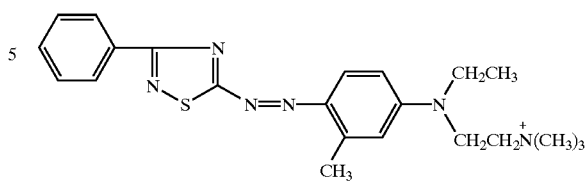

(23)

To this are added 4.0 g of a 0.8 mm-thick obeche board.

The bomb is sealed and heated to 110° C. After agitation for 4 hours at this temperature, the contents of the bomb are cooled, and the stained piece of wood is washed in cold water and dried.

An aqueous solution of 20.0 g/l of the dye stabilizer of the formula

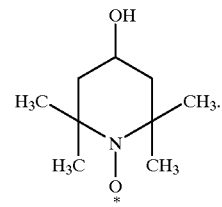

(IIId)

is applied to the stained and dried piece of wood using a knife-coater (groove depth 24 microns) and dried.

This gives an even red coloration with complete penetration in the cross section and a very good light-fastness.

EXAMPLE 2

A 0.8 mm wooden board made of ash is sanded on the upper side using fine sandpaper, moistened with a cloth, dried and again very carefully sanded. All of the wood dust is then brushed off the surface.

Using a paintbrush or a hand coater, a stain consisting of 93 parts by weight of water,
4 parts by weight of the dye stabilizer of the formula (IIId) dissolved in the water and
3 parts by weight of a 20% aqueous commercial form of the dye of the formula

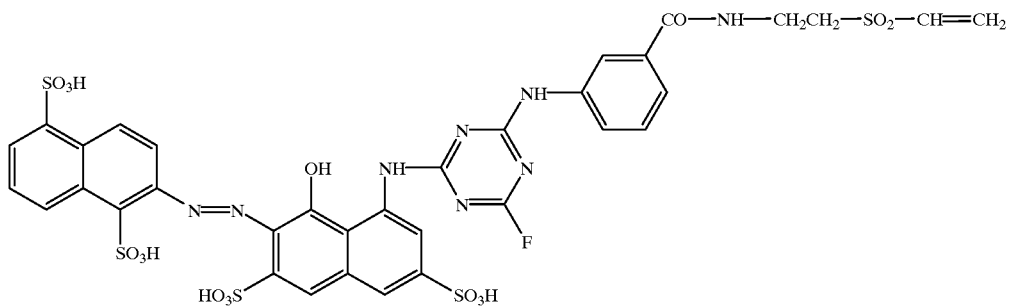
(45)

is applied to the wood surface prepared in this way in an amount of about 100 g/m².

The stained wood is then dried in the air.

This gives a brilliant red-coloured wood with a very good light-fastness.

(The ready-stained wood can then be coated with a commercially available nitrocellulose lacquer.)

EXAMPLE 3

A 0.8 mm wooden board made of ash is sanded on the upper side using fine sandpaper, moistened with a cloth, dried and again very carefully sanded. All of the wood dust is then brushed off the surface.

Using a paint brush or hand coater, a dye preparation consisting of 97 parts by weight of water and
3 parts by weight of a 20% commercial form of the dye of the formula (45) is applied to the wood surface prepared in this way in an amount of about 100 g/m² and dried.

The stained wood is then treated with a mordant consisting of 96 parts by weight of water and
4 parts by weight of the dye stabilizer of the formula (IIId).
The wood is then dried in the air.

This gives a brilliant red-coloured wood with a very good light-fastness.

(The ready-stained wood can then be coated with a commercially available nitrocellulose lacquer.)

EXAMPLE 4

A 0.8 mm wood board made of ash is sanded on the upper side using fine sandpaper, moistened with a cloth, dried and again sanded very carefully. All of the wood dust is then brushed off the surface.

Using a paint brush or hand coater, a dye preparation consisting of 97 parts by weight of water and
3 parts by weight of a 20% commercial form of the dye of the formula (45) is applied to the wood surface prepared in this way in an amount of about 100 g/m² and dried.

The stained wood is then coated with a commercially available nitrocellulose lacquer in which
4 parts by weight of the dye stabilizer of the formula

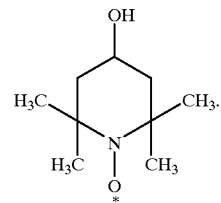
(IIId)

has been incorporated into 96 parts by weight of the lacquer.
The wood is then dried in the air.

This gives a brilliant red-coloured wood with a very good light-fastness.

EXAMPLE 5

The procedure is as stated in Examples 2 to 4, but using, instead of the dye of the formula (45), the same amount of the dye of the formula

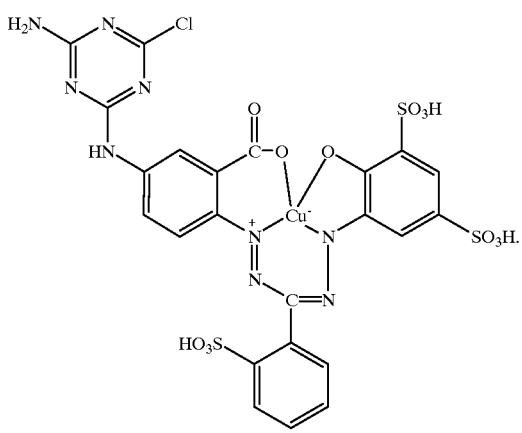
(48)

This gives a blue-coloured wood with a very good light-fastness.

EXAMPLE 6

A 0.8 mm wooden board made of ash is sanded on the upper side using fine sandpaper, moistened with a cloth, dried and sanded again very carefully. All of the wood dust is then brushed off the surface.

Using a paint brush or hand coater, a stain consisting of 96 parts by weight of water,
3 parts by weight of the dye stabilizer of the formula (IIId) dissolved in the water and
1 part by weight of a 20% aqueous commercial form of the dye of the formula

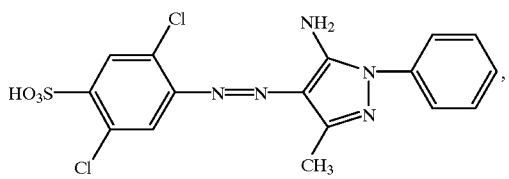

(1)

is applied to the wood surface prepared in this way in an amount of about 100 g/m².

The stained wood is dried in the air.

This gives a yellow-coloured wood with a very good light-fastness.

(The ready-stained wood can then be coated with a commercially available nitrocellulose lacquer.)

EXAMPLE 7

The procedure is as stated in Example 6, but using, instead of the dye of the formula (I), the same amount of the dye of the formula (2).

This gives a red-coloured wood with a very good light-fastness.

(The ready-stained wood can then be coated with a commercially available nitrocellulose lacquer.)

EXAMPLE 8

The procedure is as given in Example 6, but using, instead of the dye of the formula (1), the same amount of the dye of the formula (3).

This gives a blue-coloured wood with a very good light-fastness.

(The ready-stained wood can then be coated with a commercially available nitrocellulose lacquer.)

EXAMPLE 9

The procedure is as given in Example 6, but using, instead of the dye of the formula (1), the same amount of the dye of the formula (8).

This gives a blue-coloured wood with a very good light-fastness.

(The ready-stained wood can then be coated with a commercially available nitrocellulose lacquer.)

EXAMPLE 10

The procedure is as given in Example 6, but using, instead of the dye of the formula (1), the same amount of the dye of the formula (12).

This gives a blue-coloured wood with a very good light-fastness.

(The ready-stained wood can then be coated with a commercially available nitrocellulose lacquer.)

EXAMPLE 12

The procedure is as given in Example 6, but using, instead of the dye of the formula (1), the same amount of the dye of the formula (26).

This gives a yellow-coloured wood with a very good light-fastness.

(The ready-stained wood can then be coated with a commercially available nitrocellulose lacquer.)

EXAMPLE 13

The procedure is as given in Example 6, but using, instead of the dye of the formula (1), the same amount of the dye of the formula (27).

This gives a red-coloured wood with a very good light-fastness.

(The ready-stained wood can then be coated with a commercially available nitrocellulose lacquer.)

EXAMPLE 14

The procedure is as given in Example 6, but using, instead of the dye of the formula (1), the same amount of the dye of the formula (28).

This gives a brown-coloured wood with a very good light-fastness.

(The ready-stained wood can then be coated with a commercially available nitrocellulose lacquer.)

EXAMPLE 15

The procedure is as given in Example 6, but using, instead of the dye of the formula (1), the same amount of the dye of the formula (29).

This gives a Bordeaux red-coloured wood with a very good light-fastness.

(The ready-stained wood can then be coated with a commercially available nitrocellulose lacquer.)

EXAMPLE 16

The procedure is as given in Example 6, but using, instead of the dye of the formula (1), the same amount of the dye of the formula (30).

This gives an orange-coloured wood with a very good light-fastness.

(The ready-stained wood can then be coated with a commercially available nitrocellulose lacquer.)

EXAMPLE 17

The procedure is as given in Example 6, but using, instead of the dye of the formula (1), the same amount of the dye of the formula (31).

This gives a red-coloured wood with a very good light-fastness.

(The ready-stained wood can then be coated with a commercially available nitrocellulose lacquer.)

EXAMPLE 18

The procedure is as given in Example 6, but using, instead of the dye of the formula (1), the same amount of the dye of the formula (34).

This gives a black-coloured wood with a very good light-fastness.

(The ready-stained wood can then be coated with a commercially available nitrocellulose lacquer.)

EXAMPLE 19

The procedure is as given in Example 6, but using, instead of the dye of the formula (1), the same amount of the dye of the formula (42).

This gives a yellow-coloured wood with a very good light-fastness.

(The ready-stained wood can then be coated with a commercially available nitrocellulose lacquer.)

EXAMPLE 20

The procedure is as given in Example 6, but using, instead of the dye of the formula (1), the same amount of the dye of the formula (46).

This gives a black-coloured wood with a very good light-fastness.

(The ready-stained wood can then be coated with a commercially available nitrocellulose lacquer.)

EXAMPLE 21

The procedure is as given in Example 6, but using, instead of the dye of the formula (1), the same amount of the dye of the formula (48).

This gives a blue-coloured wood with a very good light-fastness.

(The ready-stained wood can then be coated with a commercially available nitrocellulose lacquer.)

EXAMPLE 22

The procedure is as given in Example 6, but using, instead of the dye of the formula (1), the same amount of the dye of the formula (49).

This gives a red-coloured wood with a very good light-fastness.

(The ready-stained wood can then be coated with a commercially available nitrocellulose lacquer.)

EXAMPLE 23

The procedure is as given in Example 6, but using, instead of the dye of the formula (1), the same amount of the dye of the formula (50).

This gives a blue-coloured wood with a very good light-fastness.

(The ready-stained wood can then be coated with a commercially available nitrocellulose lacquer.)

EXAMPLE 24

The procedure is as given in Example 6, but using, instead of the dye of the formula (1), the same amount of the dye of the formula (51).

This gives a black-coloured wood with a very good light-fastness.

(The ready-stained wood can then be coated with a commercially available nitrocellulose lacquer.)

EXAMPLE 25

The procedure is as given in Example 6, but using, instead of the dye of the formula (1), the same amount of the dye of the formula (52).

This gives a blue-coloured wood with a very good light-fastness.

(The ready-stained wood can then be coated with a commercially available nitrocellulose lacquer.)

EXAMPLE 26

A 0.8 mm wooden board made of ash is sanded on the upper side using fine sandpaper, moistened with a cloth, dried and then sanded again very carefully. All of the wood dust is then brushed off the surface.

Using a paintbrush or hand coater, a stain consisting of 91 parts by weight of water,
3 parts by weight of the dye stabilizer of the formula (IIId) dissolved in the water
3 parts by weight of the UV absorber of the formula

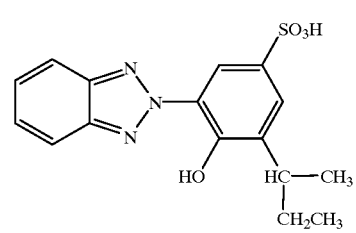

(100)

and 3 parts by weight of a 20% aqueous commercial form of the dye of the formula

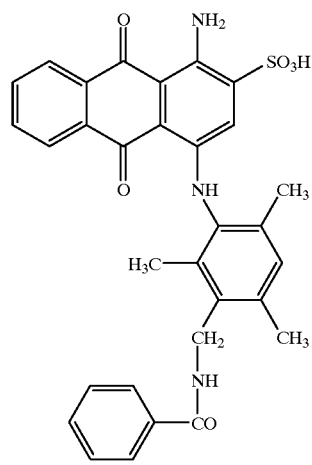

(53)

is applied to the wood surface prepared in this way in an amount of about 100 g/m².

The stained wood is then dried in the air.

This gives a brilliant blue-coloured wood with a very good light-fastness.

(The ready-stained wood can then be coated with a commercially available nitrocellulose lacquer.)

EXAMPLE 27

The procedure is as given in Example 26, but using, instead of the UV absorber of the formula (100), the same amount of the UV absorber of the formula

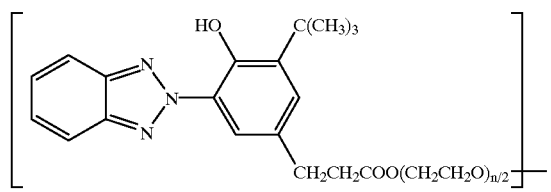

(101)

This gives a blue-coloured wood with a very good light-fastness.

(The ready-stained wood can then be coated with a commercially available nitrocellulose lacquer.)

What is claimed is:

1. A process for the staining of wood, which comprises treating the unstained wood with an aqueous preparation comprising at least one dye selected from the group consisting of the dyes of the formulae

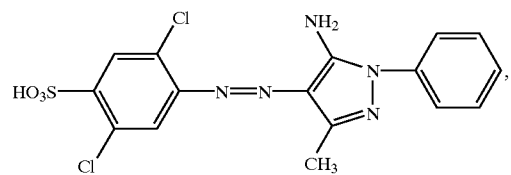
(1)

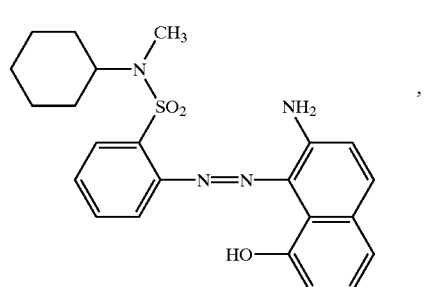
(2)

(3)

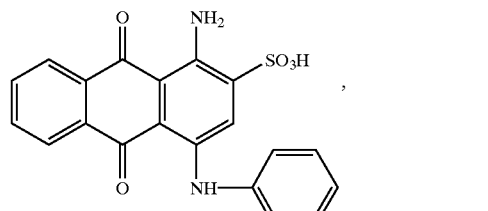
(4)

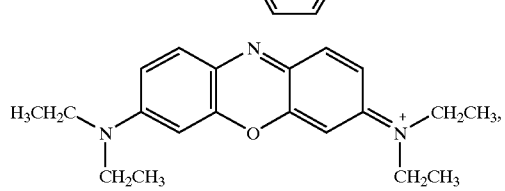

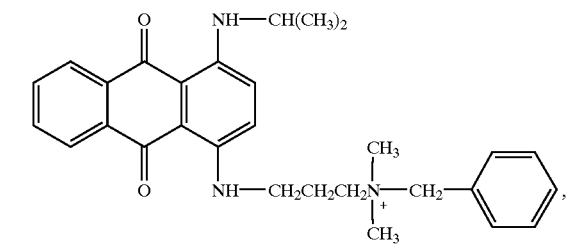
(5)

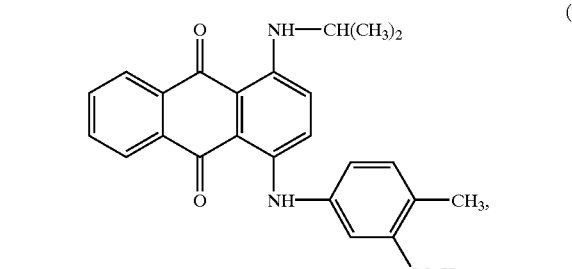
(6)

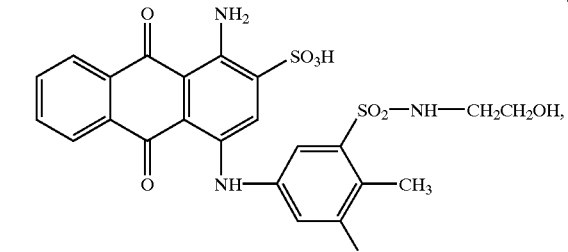
(7)

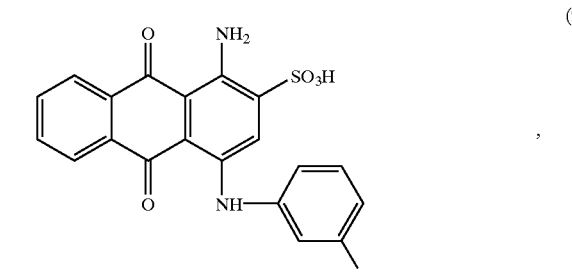
(8)

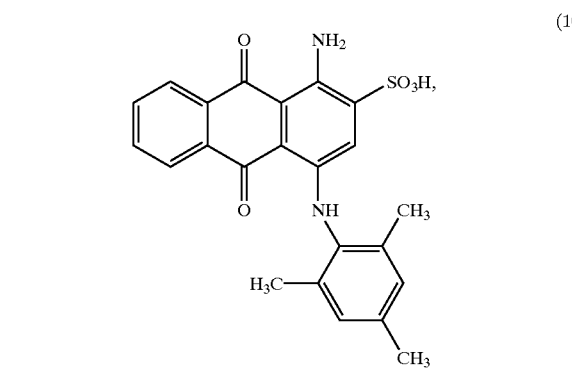
(9)

(10)

-continued
(11)
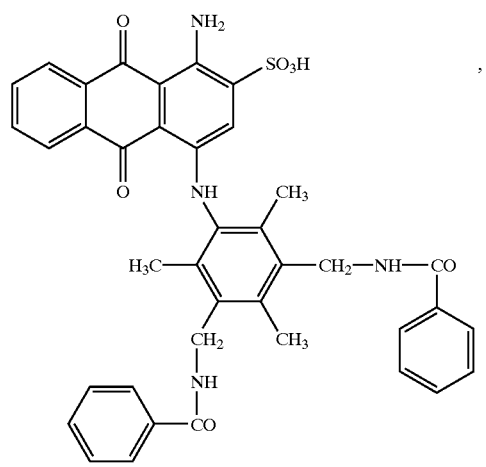
(12)
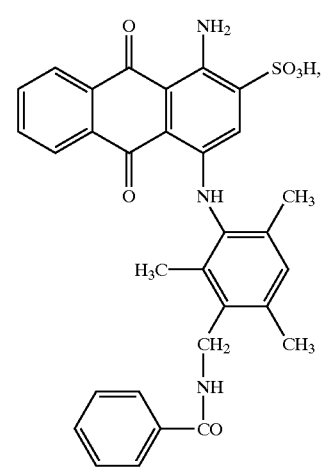
(13)
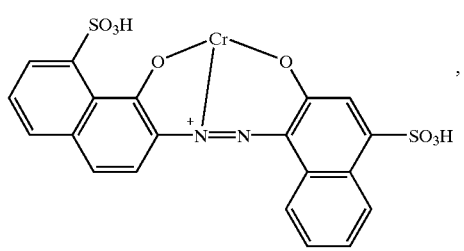
(14)
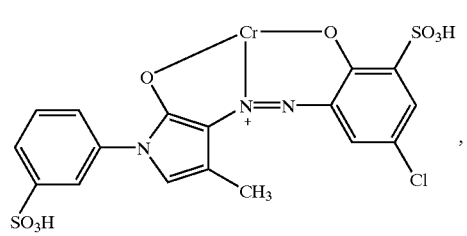
(15)
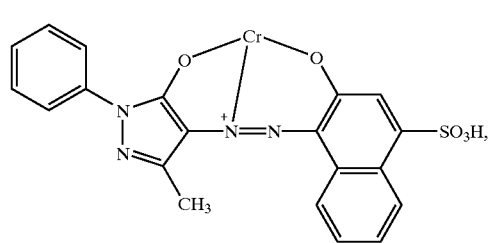
-continued
(16)
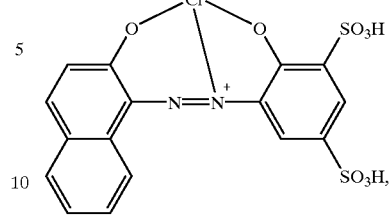
(17)
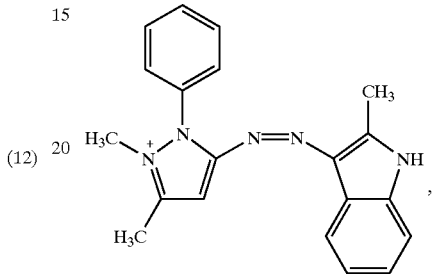
(18)
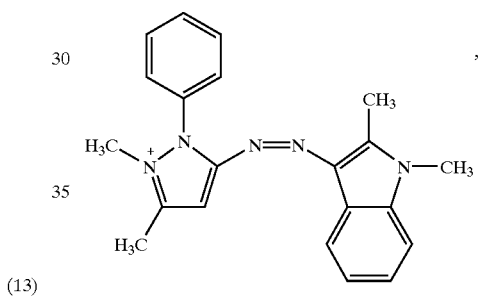
(19)
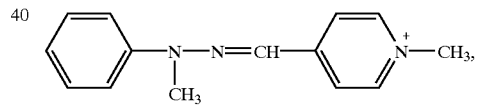
(20)
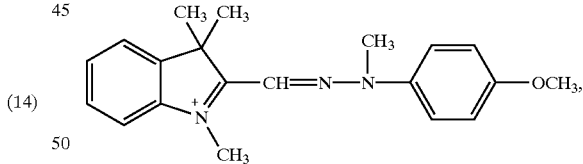
(21)
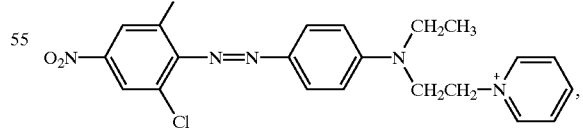
(22)
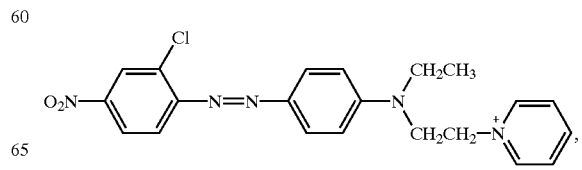

-continued
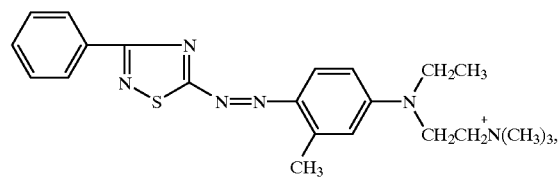 (23)
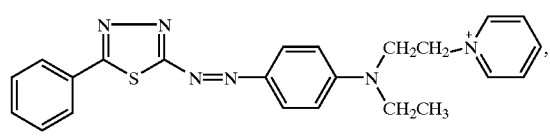 (24)
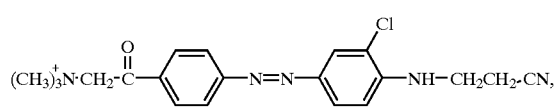 (25)
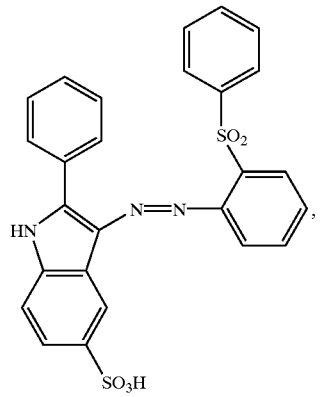 (26)
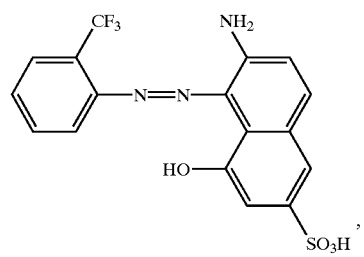 (27)
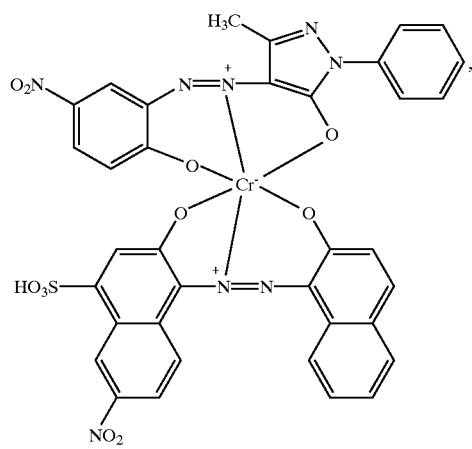 (28)
-continued
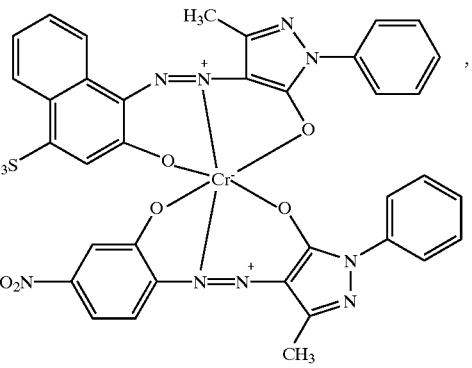 (29)
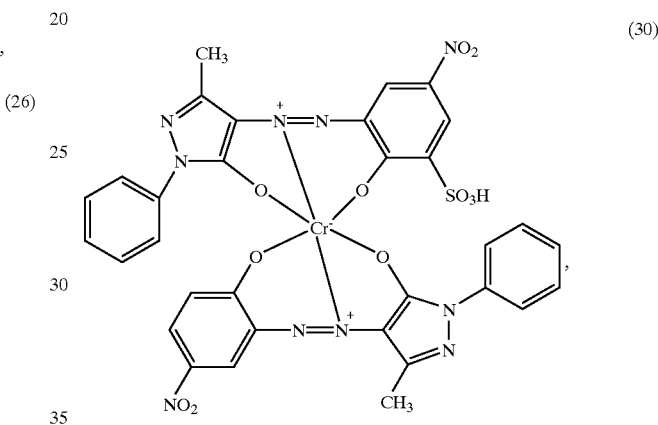 (30)
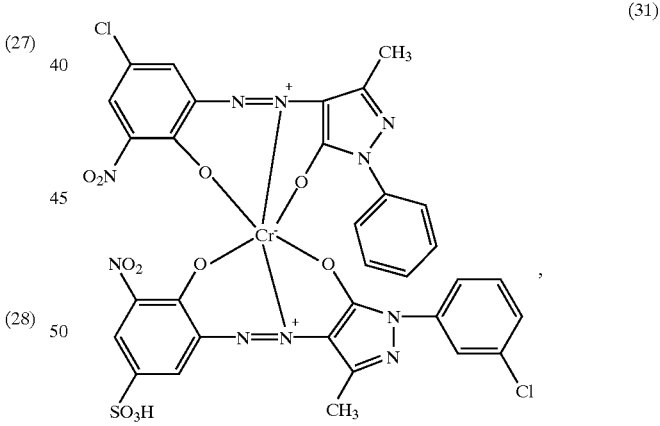 (31)
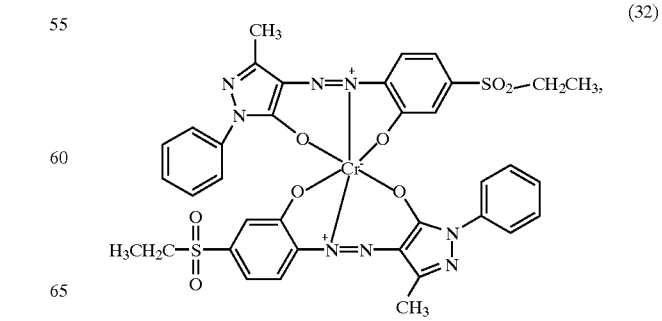 (32)

(33)
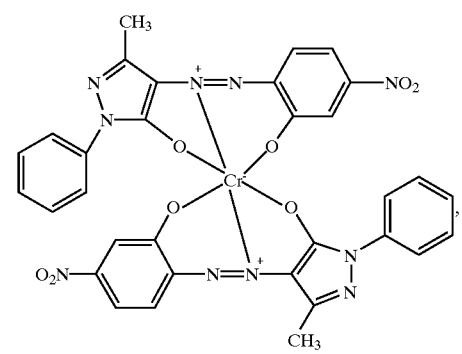
(34)
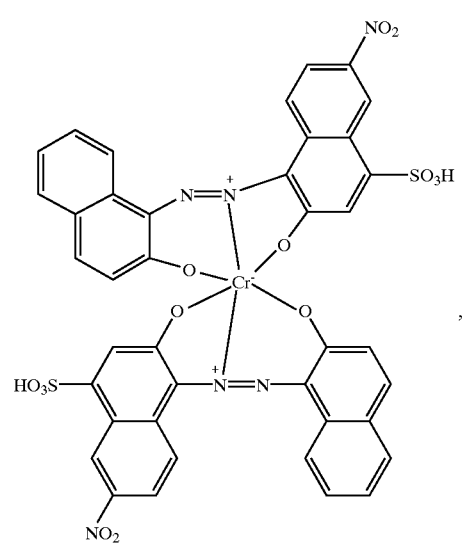
(35)
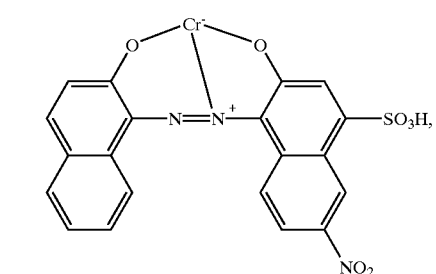
(36)
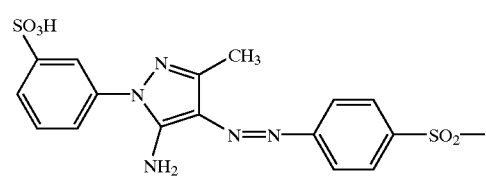
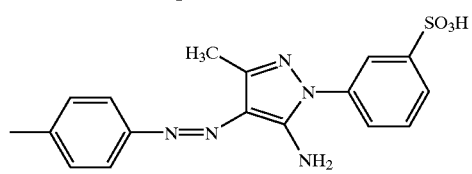
(37)
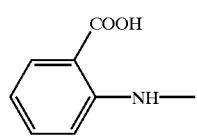
(33)
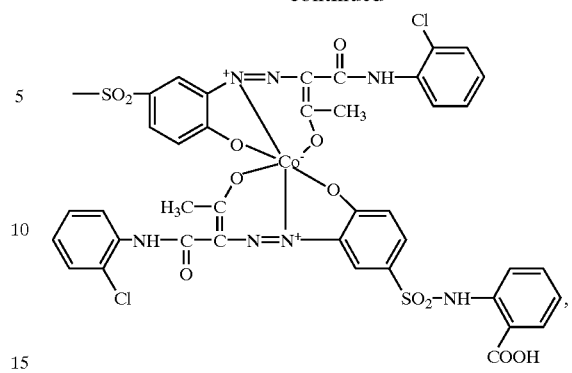
(38)
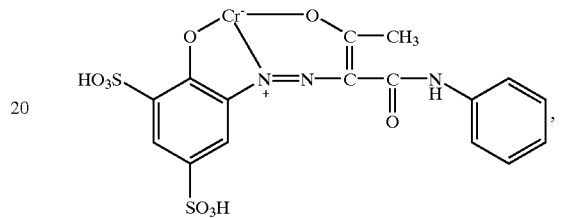
(39)
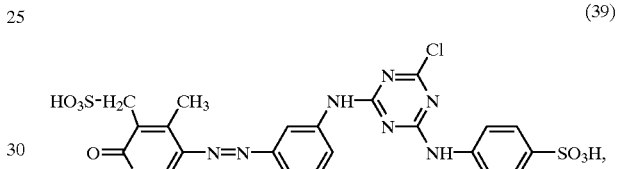
(40)
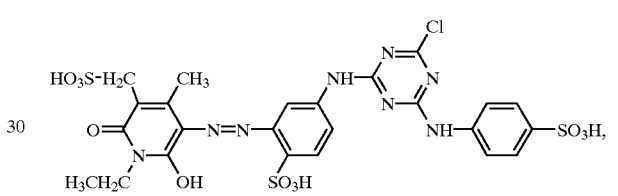
(41)
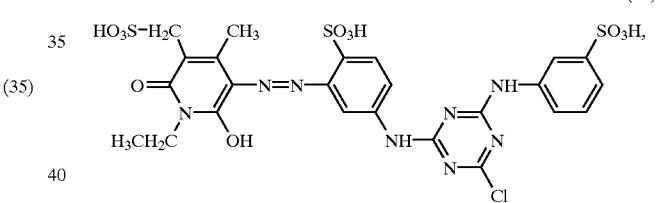
(42)
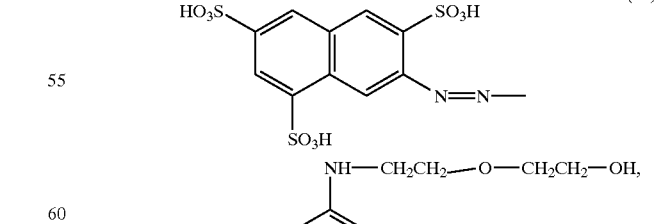

(43)
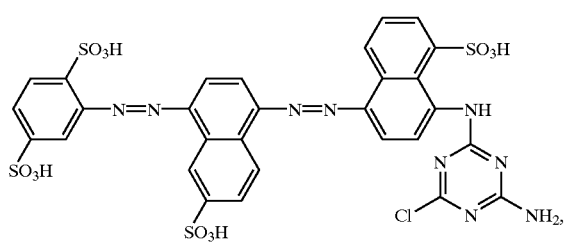
(44)
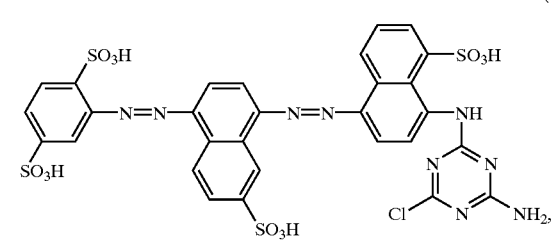
(45)
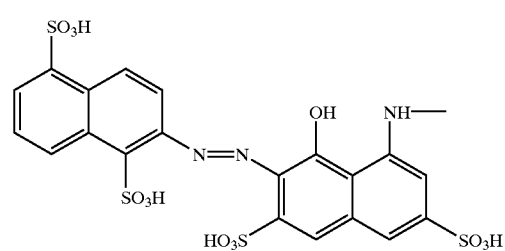
(46)
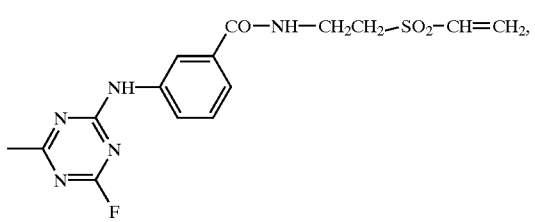
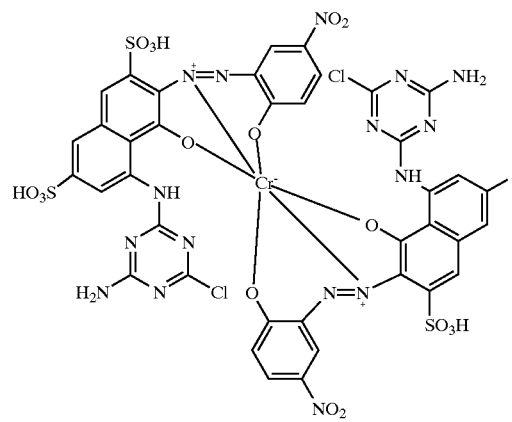
(47)
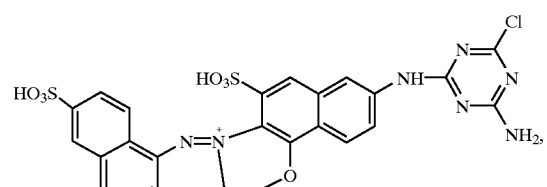
(48)
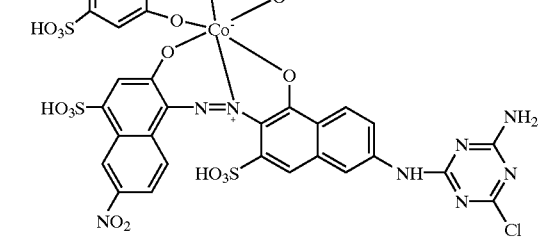
(49)
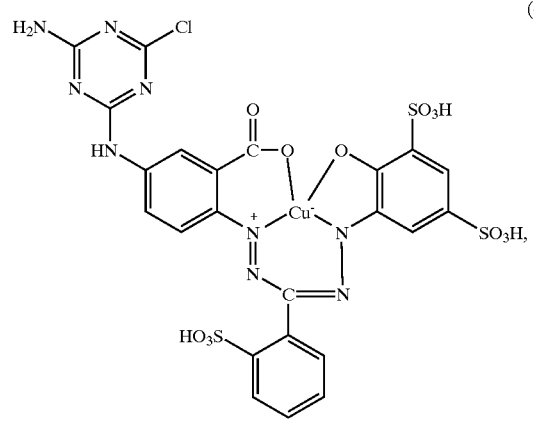
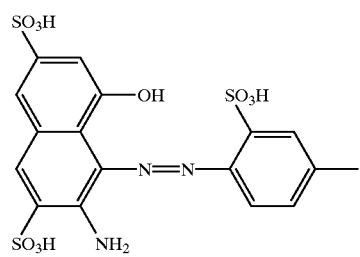
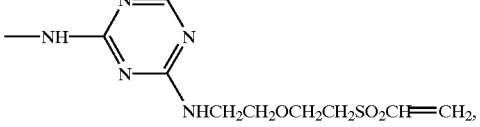
(50)
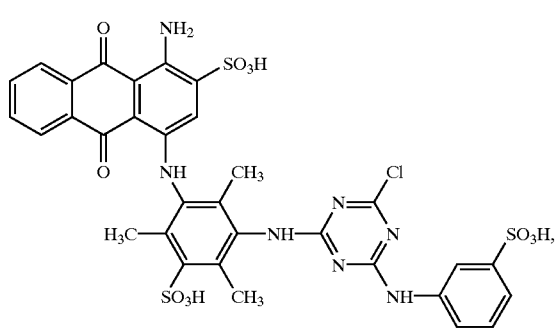

-continued

(51)
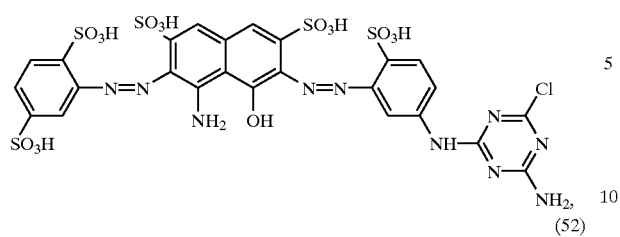

(52)
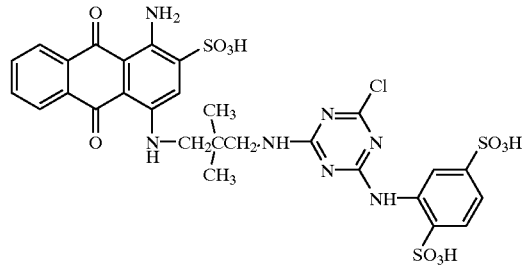

and

(53)
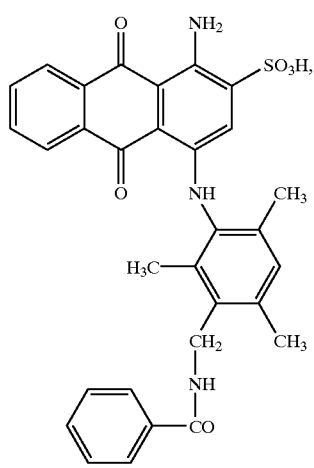

and
b) at least one dye stabilizer of the formula (A)
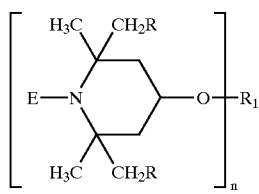

in which
E is oxyl or hydroxyl, R is hydrogen or methyl, and n is 1 or 2,
if n is 1,
$R_1$ is hydrogen, $C_1$–$C_{18}$alkyl, $C_2$–$C_{18}$alkenyl, propargyl, glycidyl, $C_2$–$C_{50}$alkyl which is unsubstituted or substituted by one to ten hydroxyl groups and which may be interrupted by one to twenty oxygen atoms, or
$R_1$ is $C_1$–$C_4$alkyl substituted by carboxyl or —COOZ, in which Z is hydrogen, $C_1$–$C_4$alkyl or phenyl or in which Z is $C_1$–$C_4$alkyl substituted by —(COO$^-$)$_n$ $M^{n+}$, in which n is a number 1–3 and M is a metal ion from the first, second or third group of the Periodic Table or is Zn, Cu, Ni or Co, or M is a group $N^{n+}(R_2)_4$, in which $R_2$ is $C_1$–$C_8$alkyl or benzyl,
if n is 2,
$R_1$ is $C_1$–$C_{12}$alkylene, $C_4$–$C_{12}$alkenylene, xylylene or $C_1$–$C_{50}$alkylene which is unsubstituted or substituted by one to ten hydroxyl groups and which may be interrupted by one to twenty oxygen atoms.

2. A process according to claim 1, wherein the dye stabilizer used is the compound 1-oxyl-2,2,6,6-tetramethyl-4-hydroxypiperidine of the formula (IIId)
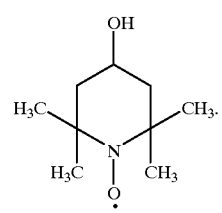

3. A process for the staining of wood, which comprises firstly staining the unstained wood with an aqueous preparation comprising at last one dye selected from the group consisting of the dyes of the formulae (1)
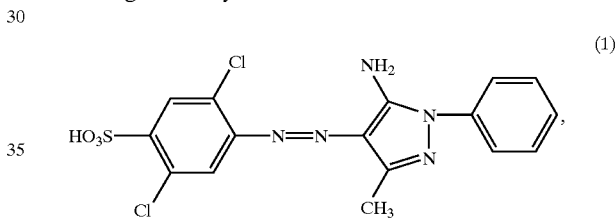

(2)
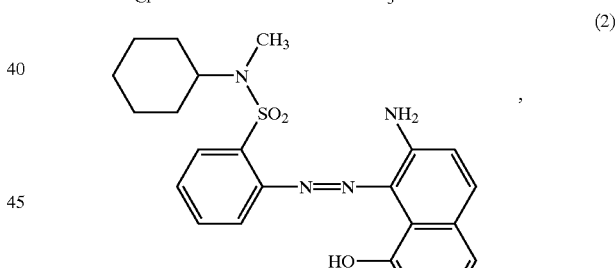

(3)
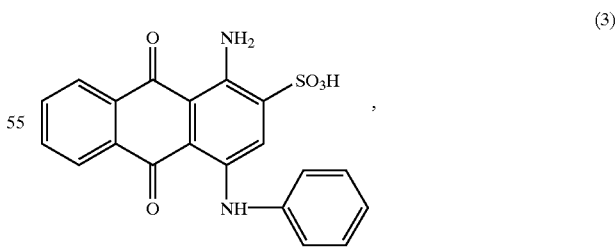

(4)
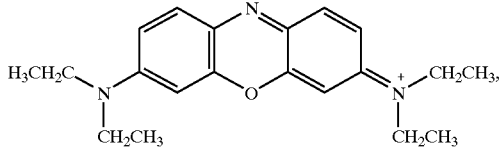

-continued
(5)
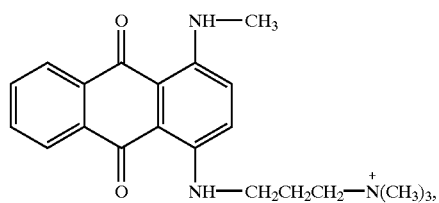
(6)
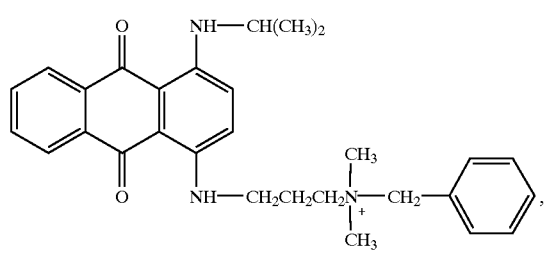
(7)
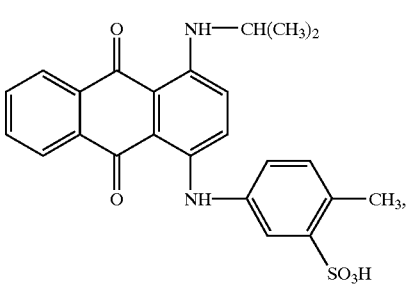
(8)
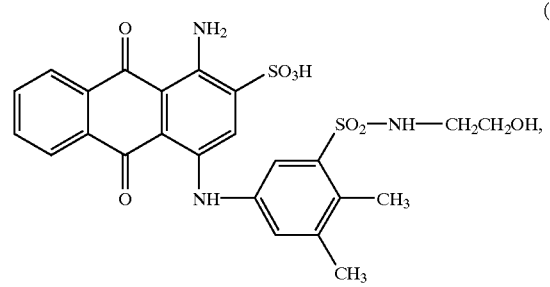
(9)
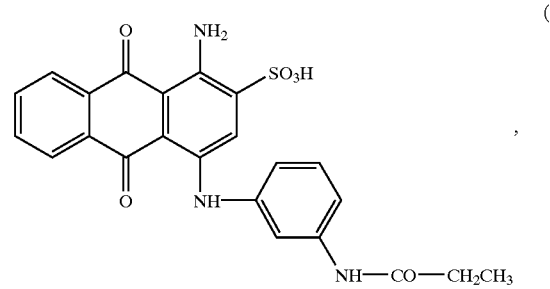
-continued
(10)
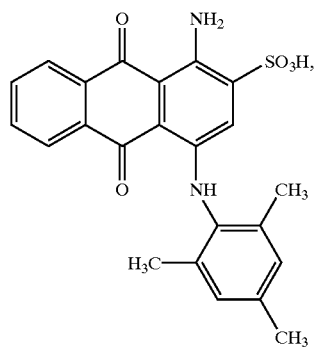
(11)
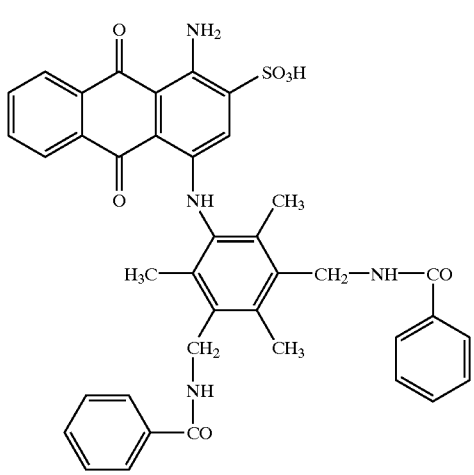
(12)
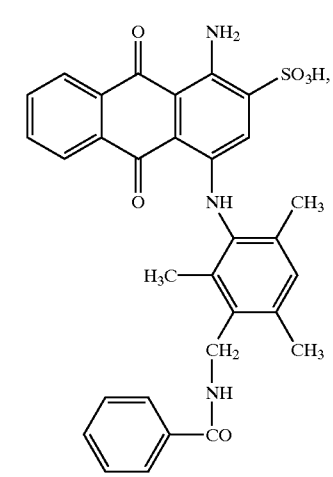
(13)
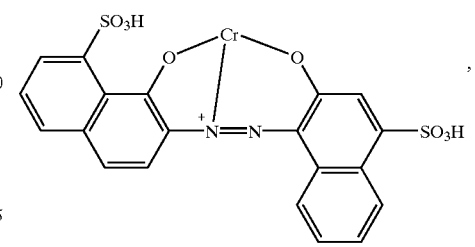

-continued
(14)
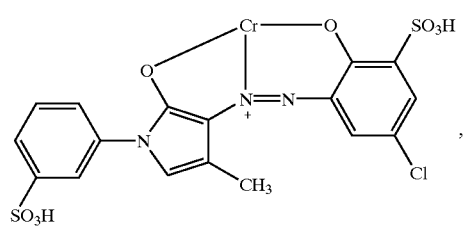
(15)
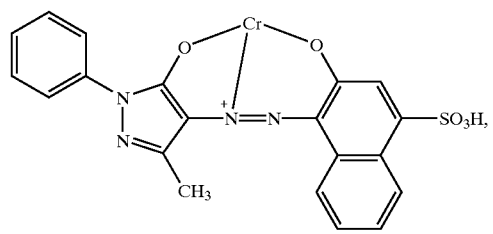
(16)
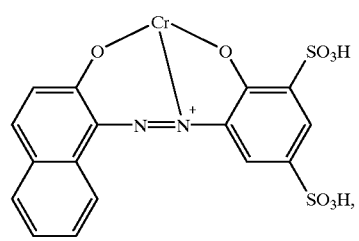
(17)
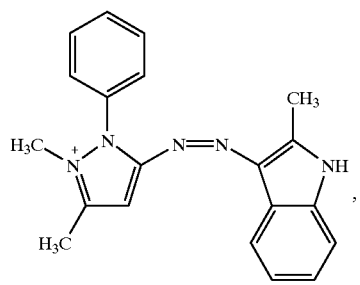
(18)
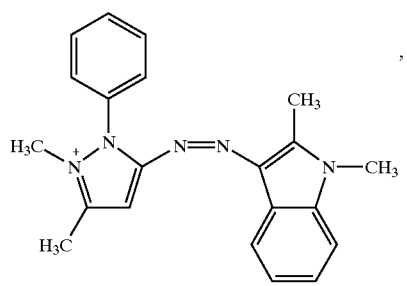
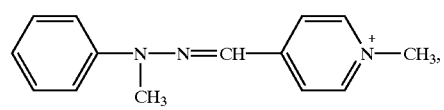
(20)
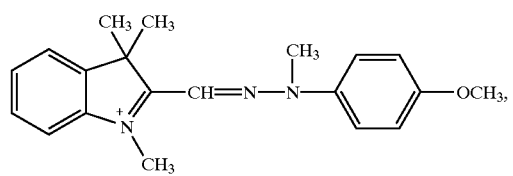
-continued
(21)
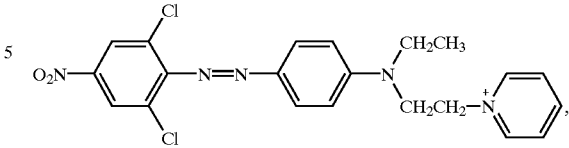
(22)
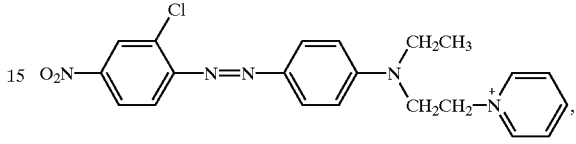
(23)
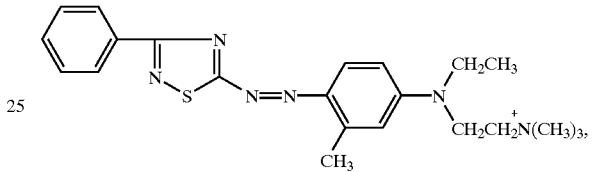
(24)
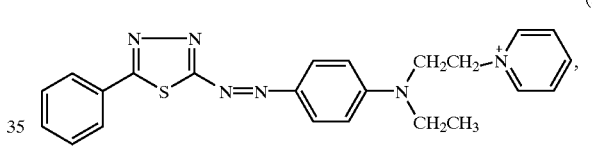
(25)
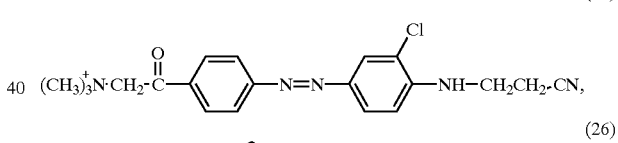
(26)
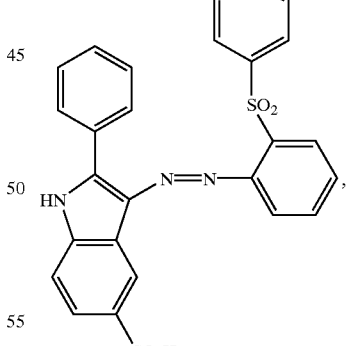
(27)
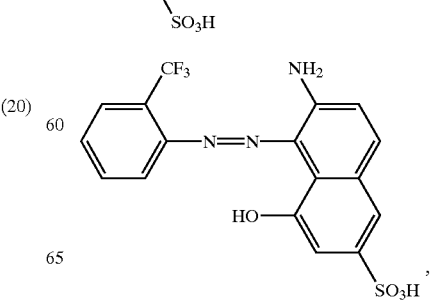

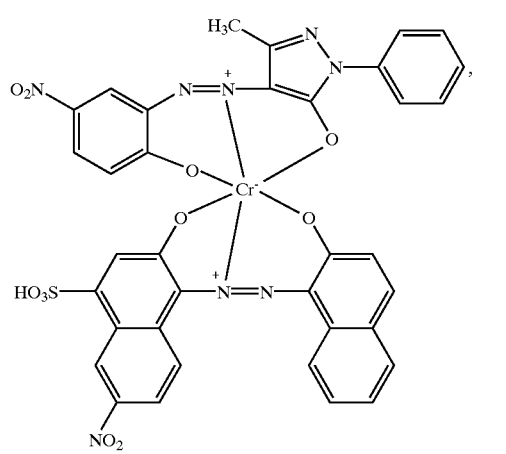
(28)
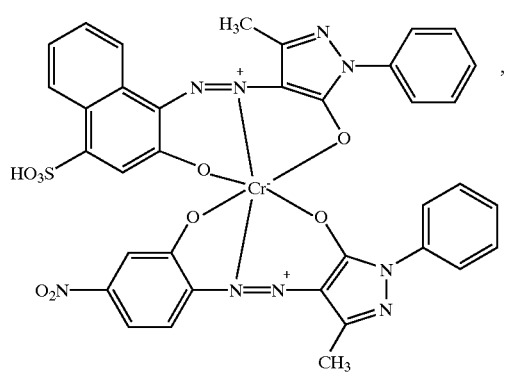
(29)
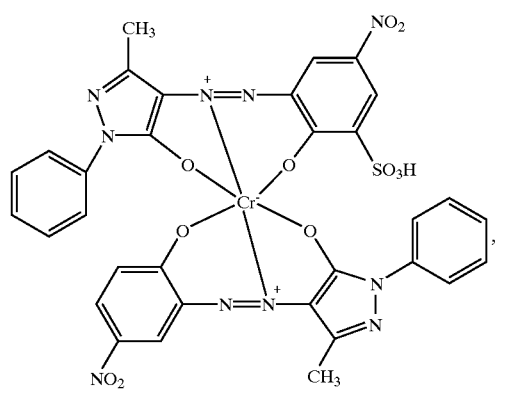
(30)
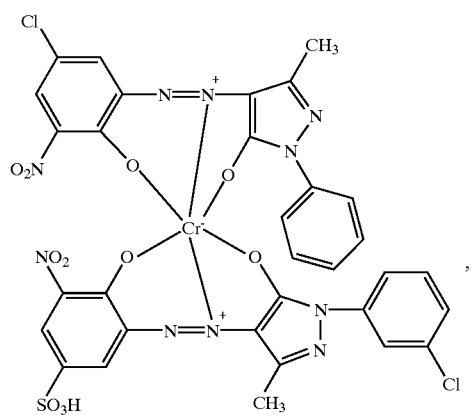
(31)
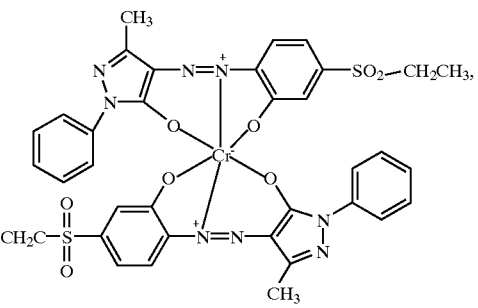
(32)
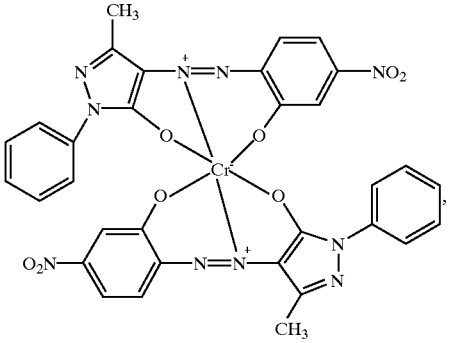
(33)
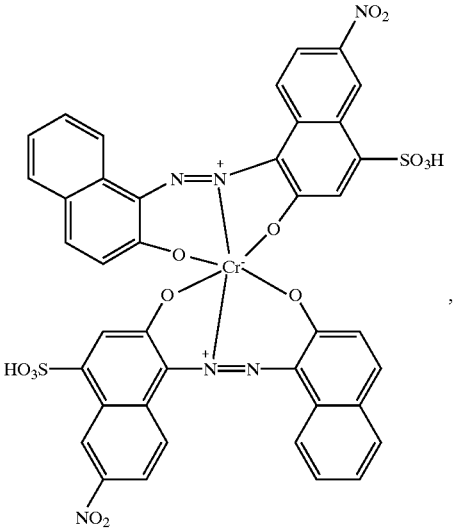
(34)
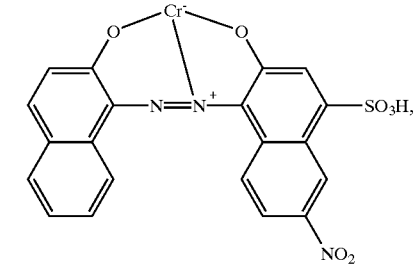
(35)
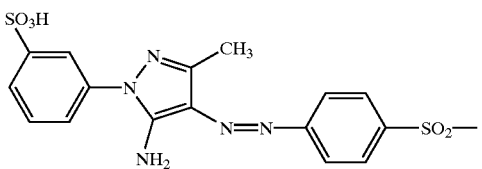
(36)

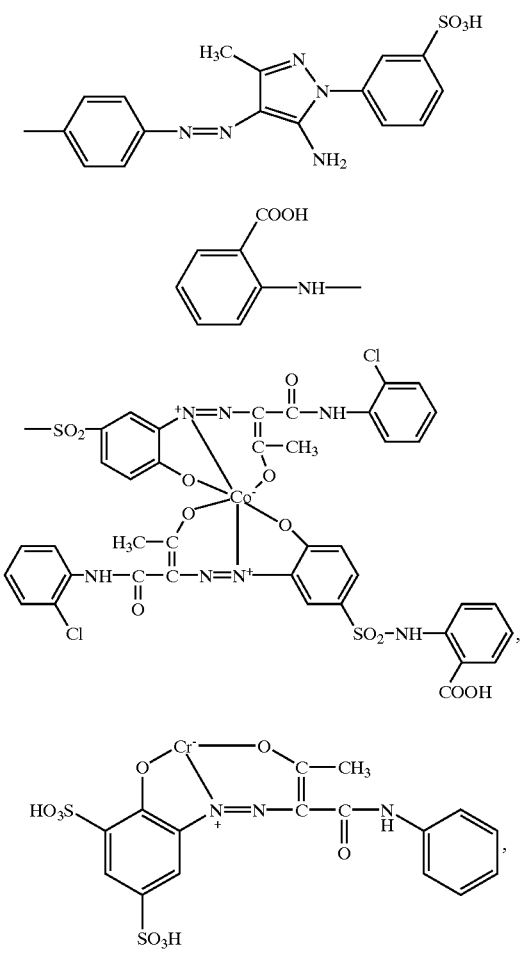
(37)
(38)
(39)
(40)
(41)
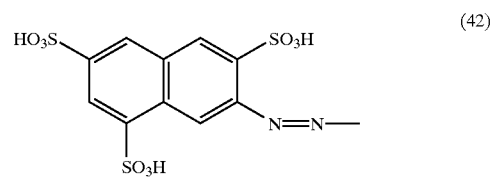
(42)
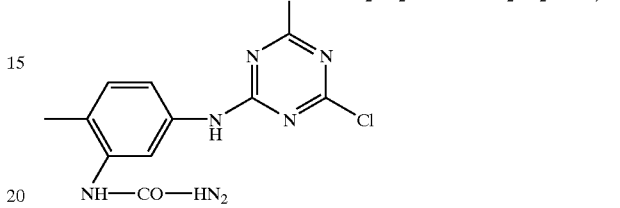
(43)
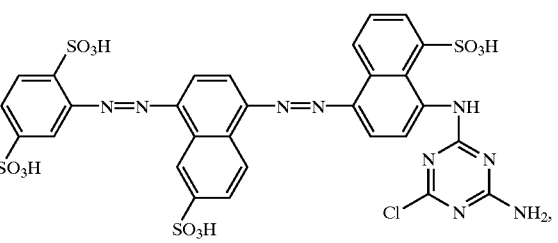
(44)
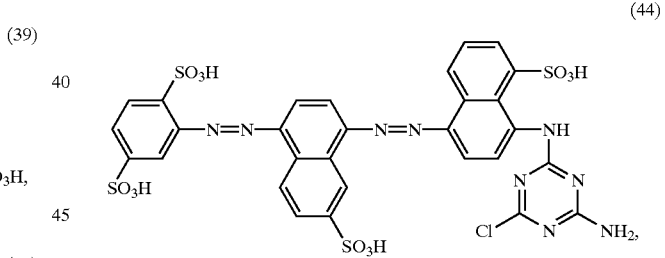
(45)
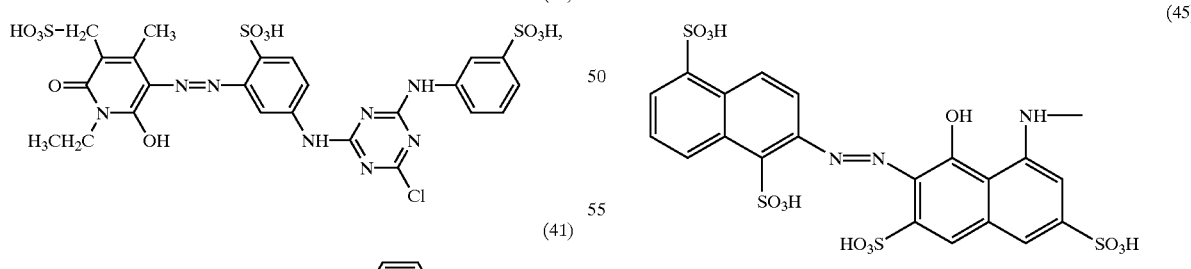
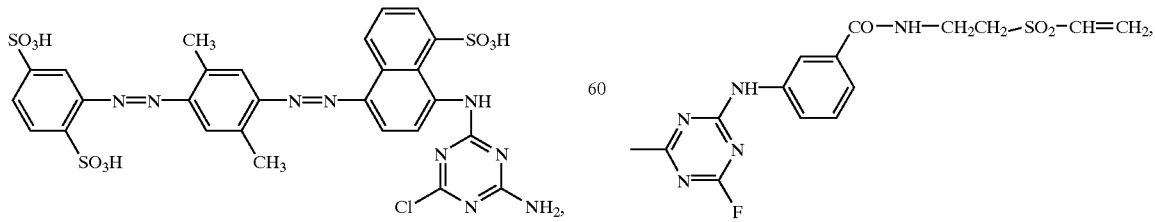

(46)
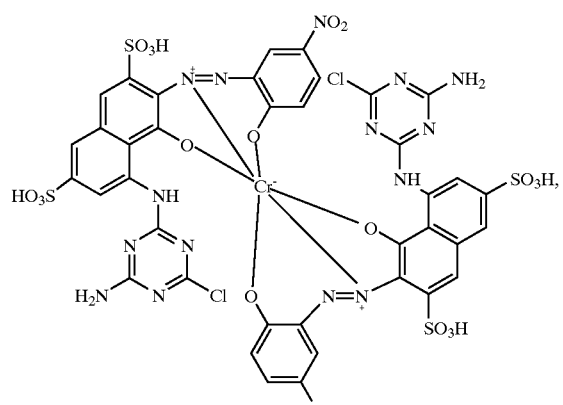
(47)
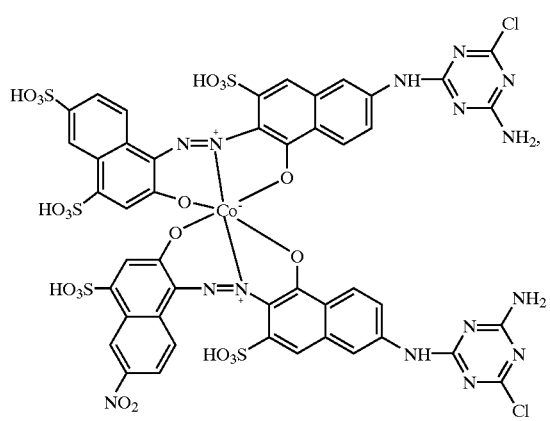
(48)
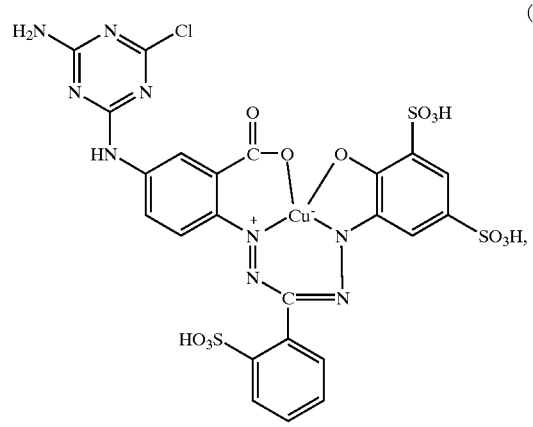
(49)
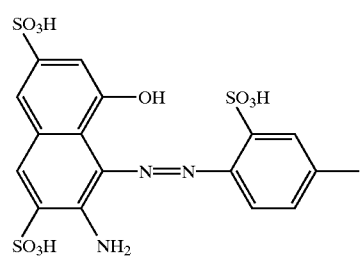
(50)
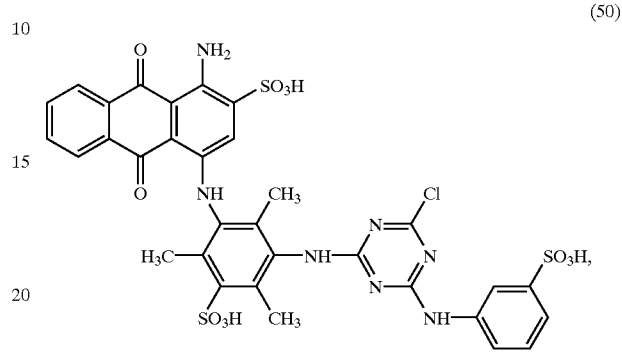
(51)
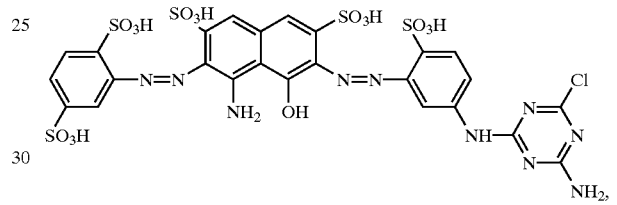
(52)
and
(53)
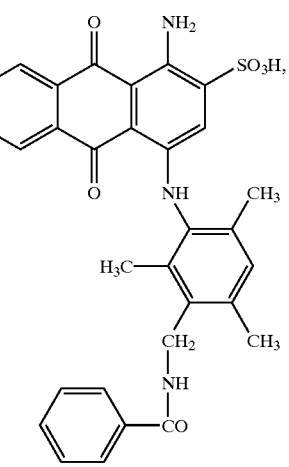
and then treating it with an aqueous preparation comprising a dye stabilizer of the formula

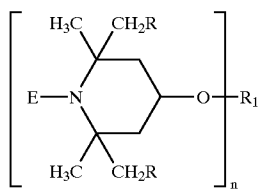
(A)

in which

E is oxyl or hydroxyl, R is hydrogen or methyl, and n is 1 or 2, if n is 1,

R$_1$ is hydrogen, C$_1$–C$_{18}$alkyl, C$_2$–C$_{18}$alkenyl, propargyl, glycidyl, C$_2$–C$_{50}$alkyl which is unsubstituted or substituted by one to ten hydroxyl groups and which may be interrupted by one to twenty oxygen atoms, or R$_1$ is C$_1$–C$_4$alkyl substituted by carboxyl or —COOZ, in which Z is hydrogen, C$_1$–C$_4$alkyl or phenyl or in which Z is C$_1$–C$_4$alkyl substituted by —(COO$^-$)$_n$ M$^{n+}$, in which n is a number 1–3 and M is a metal ion from the first, second or third group of the Periodic Table or is Zn, Cu, Ni or Co, or M is a group N$^{n+}$(R$_2$)$_4$, in which R$_2$ is C$_1$–C$_8$alkyl or benzyl, if n is 2, R$_1$ is C$_1$–C$_{12}$alkylene, C$_4$–C$_{12}$alkenylene, xylylene or C$_1$–C$_{50}$alkylene which is unsubstituted or substituted by one to ten hydroxyl groups and which may be interrupted by one to twenty oxygen atoms.

4. A process according to claim 3, wherein the dye stabilizer used is the compound 1-oxyl-2,2,6,6-tetramethyl-4-hydroxypiperidine of the formula

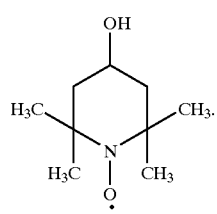
(IIId)

5. An aqueous wood stain comprising at least one dye selected from the group consisting of the dyes of the formulae

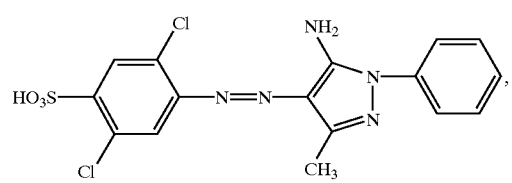
(1)

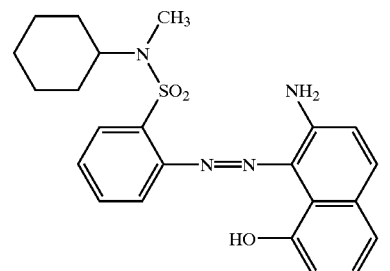
(2)

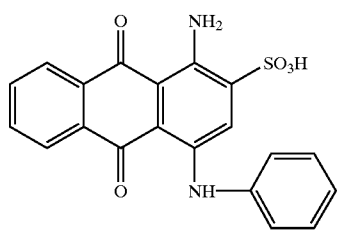
(3)

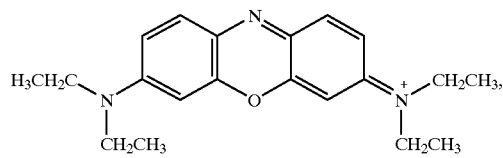
(4)

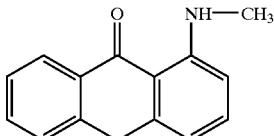
(5)

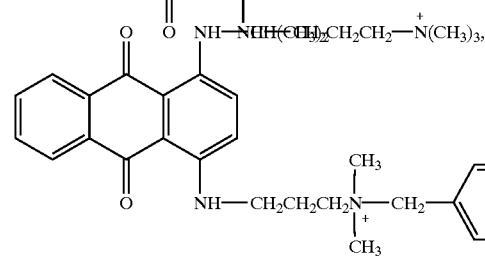
(6)

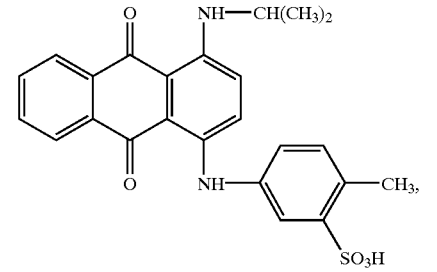
(7)

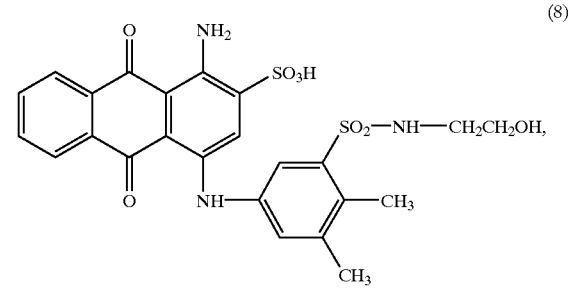
(8)

-continued
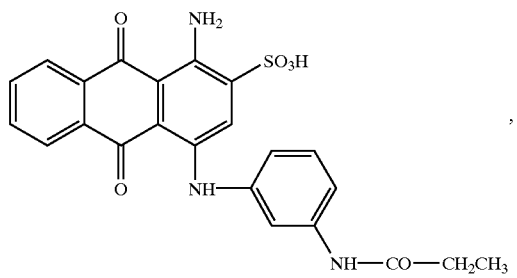 (9)
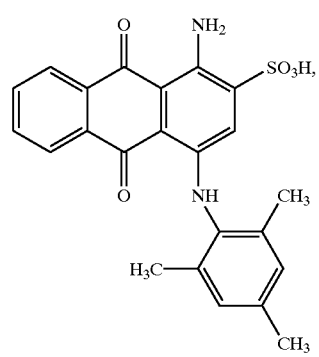 (10)
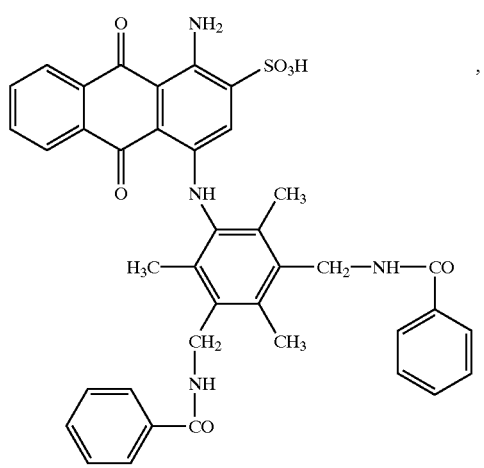 (11)
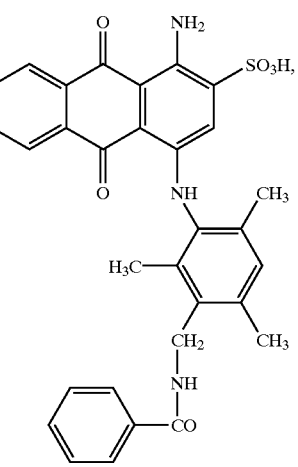 (12)
-continued
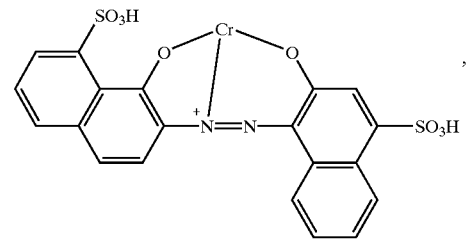 (13)
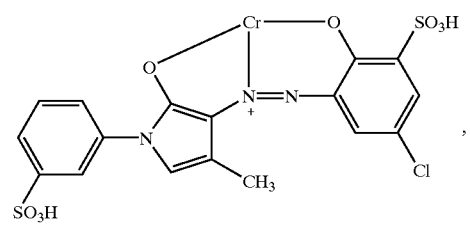 (14)
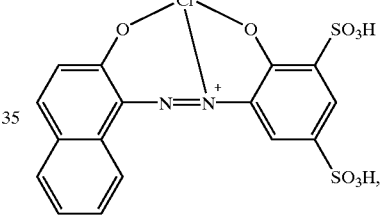 (15)
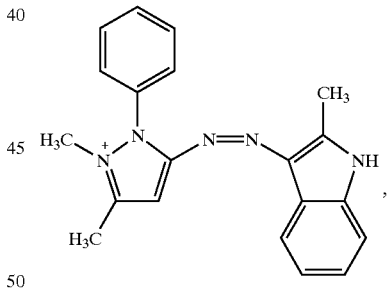 (16)
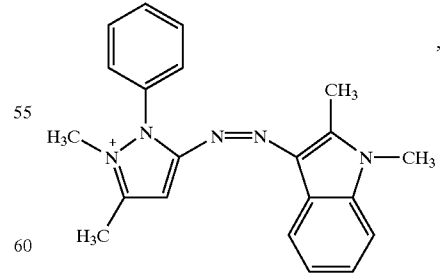 (17)
(18)
(19)

(20)
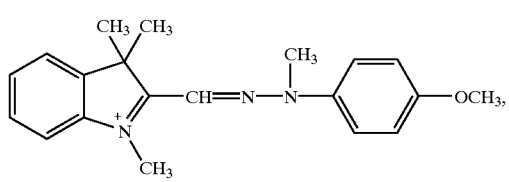
(21)
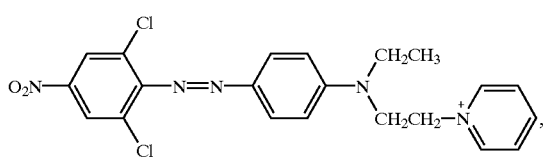
(22)
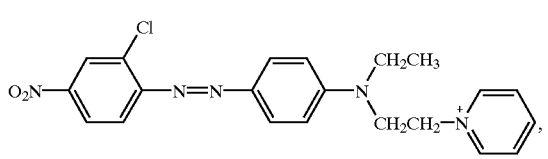
(23)
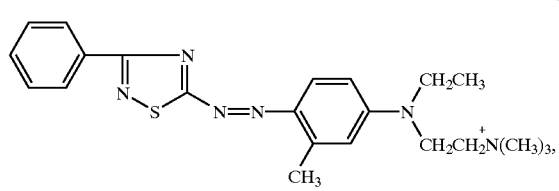
(24)
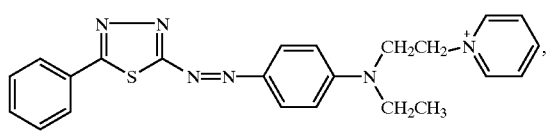
(25)
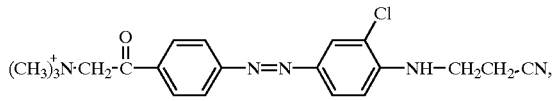
(26)
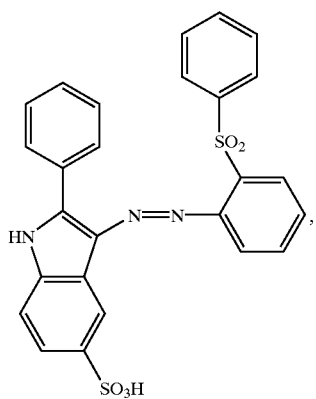
(27)
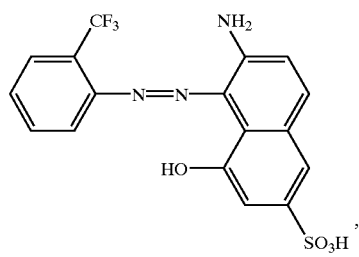
(28)
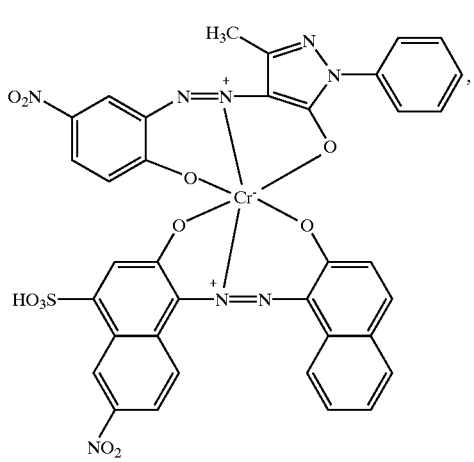
(29)
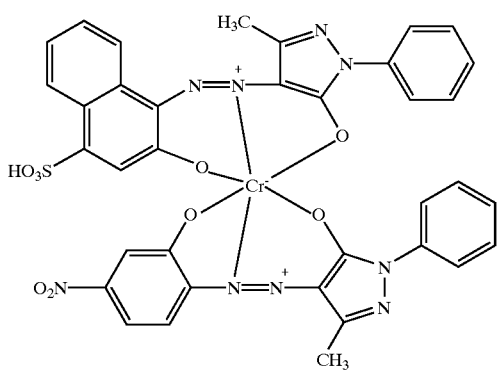
(30)
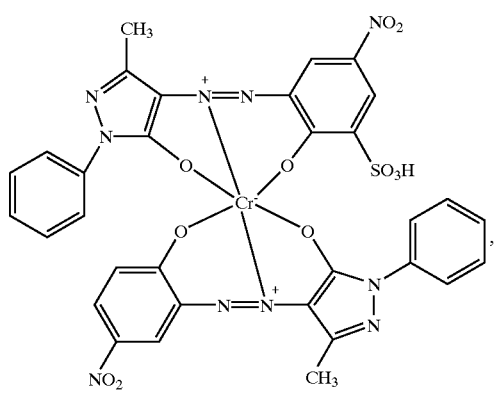

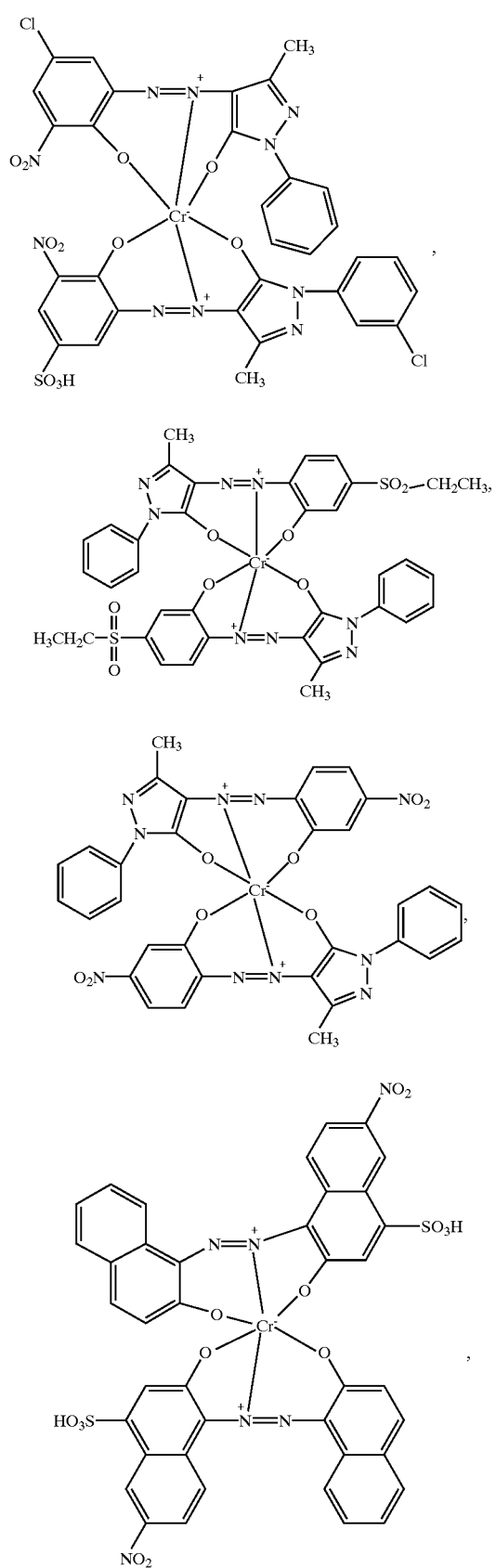
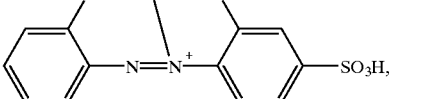
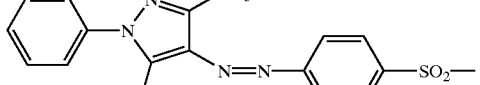
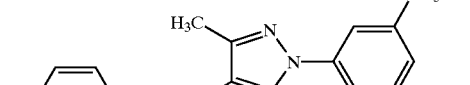
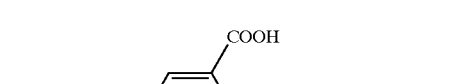
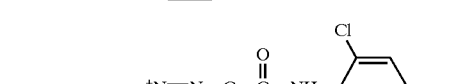
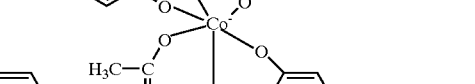
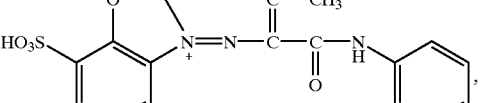
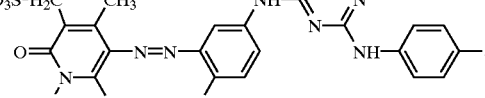

-continued
(40)
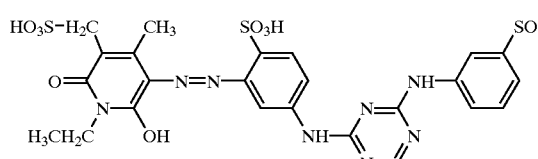
(41)
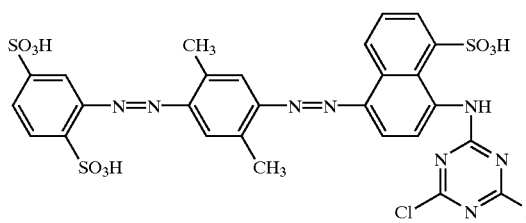
(42)
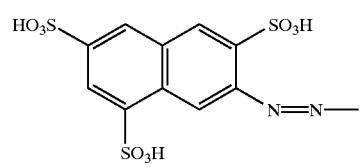
(43)
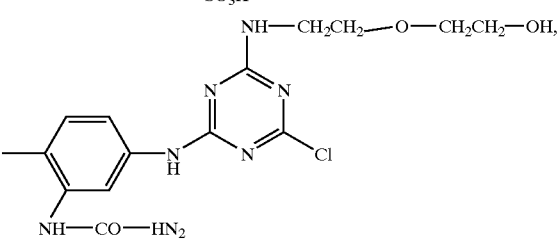
(44)
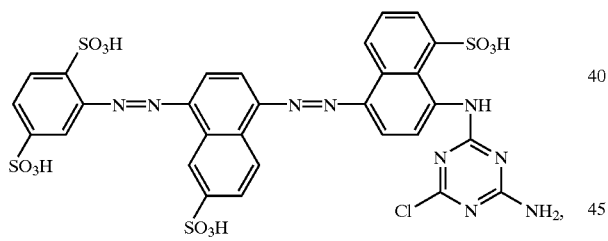
(45)
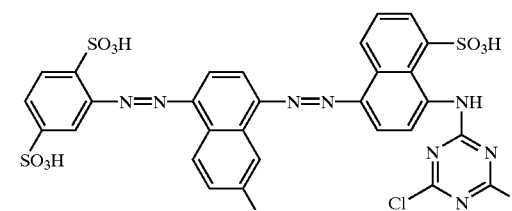
-continued
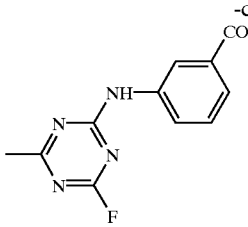
(46)
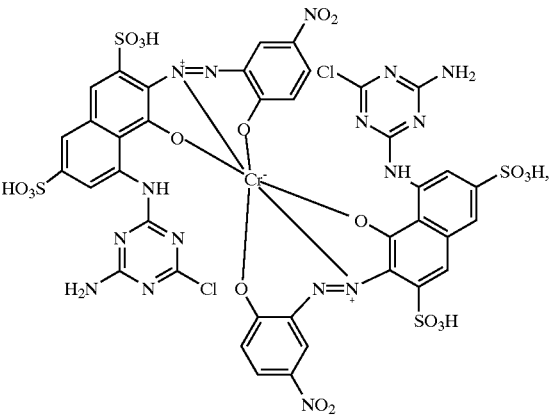
(47)
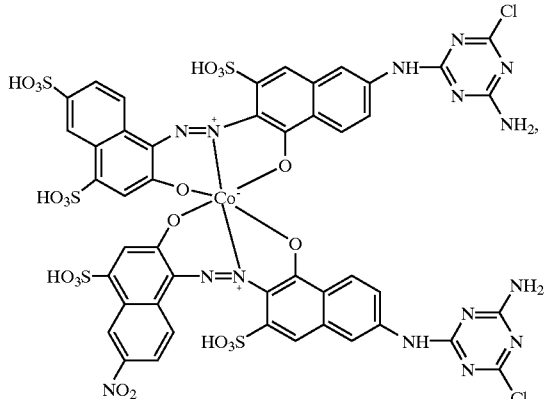
(48)
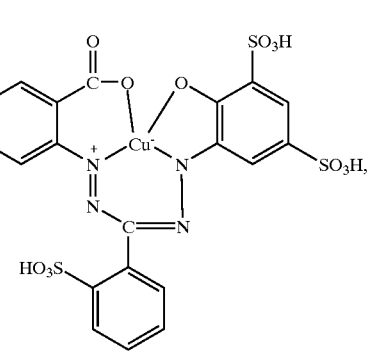

-continued

(49)
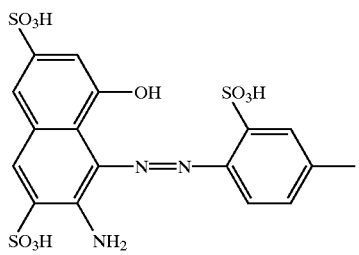

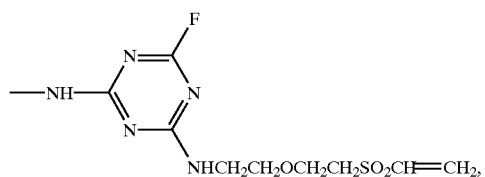
(50)

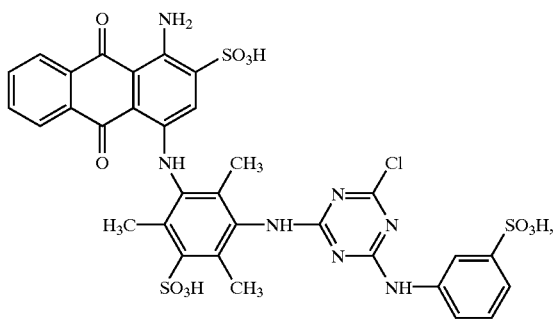
(51)

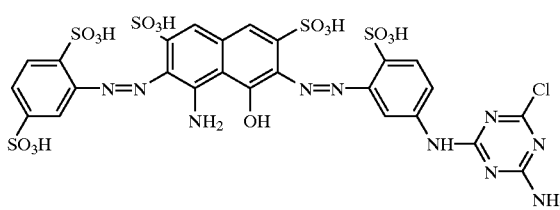
(52)

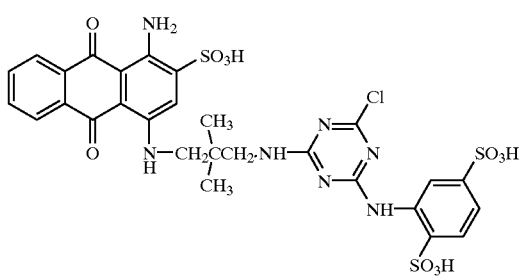

and

-continued

(53)
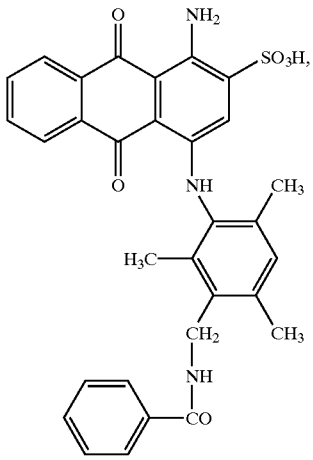

and at least one dye stabilizer of the formula (A)
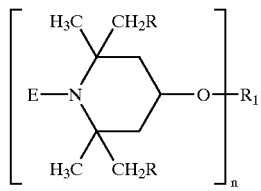

in which
E is oxyl or hydroxyl, R is hydrogen or methyl, and n is 1 or 2,
if n is 1,
$R_1$ is hydrogen, $C_1$–$C_{18}$alkyl, $C_2$–$C_{18}$alkenyl, propargyl, glycidyl, $C_2$–$C_{50}$alkyl which is unsubstituted or substituted by one to ten hydroxyl groups and which may be interrupted by one to twenty oxygen atoms, or
$R_1$ is $C_1$–$C_4$alkyl substituted by carboxyl or —COOZ, in which Z is hydrogen, $C_1$–$C_4$alkyl or phenyl or in which Z is $C_1$–$C_4$alkyl substituted by —(COO$^-$)$_n$ M$^{n+}$, in which n is a number 1–3 and M is a metal ion from the first, second or third group of the Periodic Table or is Zn, Cu, Ni or Co, or M is a group N$^{n+}$(R$_2$)$_4$, in which $R_2$ is $C_1$–$C_8$alkyl or benzyl,
if n is 2,
$R_1$ is $C_1$–$C_{12}$alkylene, $C_4$–$C_{12}$alkenylene, xylylene or $C_1$–$C_{50}$alkylene which is unsubstituted or substituted by one to ten hydroxyl groups and which may be interrupted by one to twenty oxygen atoms.

6. An aqueous wood stain according to claim 5, wherein the dye stabilizer used is the compound 1-oxyl-2,2,6,6-tetramethyl-4-hydroxypiperidine of the formula (IIId)
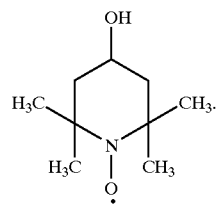

* * * * *